United States Patent
Murashita et al.

(10) Patent No.: US 6,850,245 B1
(45) Date of Patent: Feb. 1, 2005

(54) DISPLAY CHARACTERISTICS RECOGNITION APPARATUS, DISPLAY CHARACTERISTICS RECOGNITION PROGRAM STORAGE MEDIUM, COMPUTER SYSTEM, DISPLAY CHARACTERISTICS ADJUSTING APPARATUS AND DISPLAY CHARACTERISTICS ADJUSTING PROGRAM STORAGE MEDIUM

(75) Inventors: Kimitaka Murashita, Kawasaki (JP); Shoji Suzuki, Kawasaki (JP); Masahiro Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/494,534

(22) Filed: Jan. 31, 2000

(30) Foreign Application Priority Data

Apr. 7, 1999 (JP) .......................................... 11-100082

(51) Int. Cl.⁷ ................................................ G09G 5/02
(52) U.S. Cl. ........................ 345/589; 345/593; 345/594; 348/189; 348/190; 348/191; 348/184; 348/181
(58) Field of Search ........................ 345/418, 589–594; 348/181, 184, 189–191

(56) References Cited

U.S. PATENT DOCUMENTS

| | | | | |
|---|---|---|---|---|
| 5,216,504 A | * | 6/1993 | Webb et al. ................. 348/190 |
| 5,247,358 A | * | 9/1993 | Richards ..................... 348/191 |
| 5,381,349 A | * | 1/1995 | Winter et al. ............... 382/167 |
| 5,416,890 A | * | 5/1995 | Beretta ........................ 345/590 |
| 5,483,259 A | * | 1/1996 | Sachs ......................... 345/600 |
| 5,574,664 A | * | 11/1996 | Feasey ........................ 702/107 |
| 5,611,028 A | | 3/1997 | Shibasaki et al. |
| 5,611,030 A | * | 3/1997 | Stokes ........................ 345/590 |
| 5,638,117 A | | 6/1997 | Engeldrum et al. |
| 5,670,985 A | * | 9/1997 | Cappels et al. ............. 345/601 |
| 5,739,809 A | * | 4/1998 | McLaughlin et al. ....... 345/594 |
| 5,786,803 A | * | 7/1998 | Hernandez et al. ......... 345/600 |
| 5,786,823 A | * | 7/1998 | Madden et al. ............. 345/591 |
| 5,806,081 A | | 9/1998 | Swen et al. |
| 5,943,036 A | * | 8/1999 | Tanaka ....................... 358/611 |
| 6,269,184 B1 | * | 7/2001 | Spaulding et al. .......... 382/167 |
| 6,313,824 B1 | * | 11/2001 | Meisner et al. ............. 345/589 |

FOREIGN PATENT DOCUMENTS

EP 0 750 431 12/1996

* cited by examiner

Primary Examiner—Alexander Eisen
Assistant Examiner—Faranak Fouladi
(74) Attorney, Agent, or Firm—Staas & Halsey LLP

(57) ABSTRACT

A display characteristics recognition apparatus has a color chart data output unit outputting a color chart data representative of a predetermined color chart to a display unit, a color name input unit for entering a name of a color of the color chart, and a display characteristics identification unit for determining display characteristics of the display unit in accordance with the color chart data outputted from the color chart output unit and the name of the color entered through the color name input unit.

33 Claims, 17 Drawing Sheets

Fig.14

| ADDRESS (OCTONARY) | DATA (HEXADECIMAL NOTATION) | |
|---|---|---|
| 00000000 | 0000 033c 4b43 4d53 0200 0000 6d6e 7472 | ⎫ |
| 00000020 | 5247 4220 5859 5a20 07c f 0001 0007 000a | ⎪ |
| 00000040 | 0029 002a 6163 7370 4d53 4654 0000 0000 | ⎪ |
| 00000060 | 4655 4a49 5445 5354 0000 0000 0000 0000 | ⎬ 1 |
| 00000100 | 0000 0000 0000 f 6d5 0001 0000 0000 d32b | ⎪ |
| 00000120 | 4655 4a49 0000 0000 0000 0000 0000 0000 | ⎪ |
| 00000140 | 0000 0000 0000 0000 0000 0000 0000 0000 | ⎪ |
| 00000160 | 0000 0000 0000 0000 0000 0000 0000 0000 | ⎭ |
| 00000200 | 0000 000b 6465 7363 0000 0108 0000 0078 | ⎫ |
| 00000220 | 646d 6e64 0000 0180 0000 0072 646d 6464 | ⎪ |
| 00000240 | 0000 01f 4 0000 0072 6370 7374 0000 0268 | ⎪ |
| 00000260 | 0000 0046 7774 7074 0000 02b0 0000 0014 | ⎪ |
| 00000300 | 7258 595a 0000 02c4 0000 0014 6758 595a | ⎬ 3 |
| 00000320 | 0000 02d8 0000 0014 6258 595a 0000 02ec | ⎪ |
| 00000340 | 0000 0014 7254 5243 0000 0300 0000 0012 | ⎪ |
| 00000360 | 6754 5243 0000 0314 0000 0012 6245 5243 | ⎭ |
| 00000400 | 0000 0328 0000 0012/6465 7363 0000 0000 | ⎫ |
| 00000420 | 0000 0008 4675 6a69 7473 7500 0000 0000 | ⎪ |
| 00000440 | 0000 000b f e f f 0046 0075 006a 0069 0074 | ⎪ |
| 00000460 | 0073 0075 0000 4891 c62d 0000 0746 756a | ⎬ 110 |
| 00000500 | 6974 7375 0000 0000 0000 0000 0000 0000 | ⎪ |
| 00000520 | 0000 0000 0000 0000 0000 0000 0000 0000 | ⎪ |
| 00000540 | 0000 0000 0000 0000 0000 0000 0000 0000 | ⎪ |
| 00000560 | 0000 0000 0000 0000 0000 0000 0000 0000 | ⎭ |
| 00000600 | 6465 7363 0000 0000 0000 0007 5361 6d70 | ⎫ |
| 00000620 | 6c65 0000 0000 0000 0000 08f e f f 00 5300 | ⎪ |
| 00000640 | 6100 6d00 7000 6c00 6500 0000 0007 5361 | ⎪ |
| 00000650 | 6d70 6c65 0006 0000 0000 0000 0000 0000 | ⎬ 111 |
| 00000700 | 0000 0000 0000 0000 0000 0000 0000 0000 | ⎪ |
| 00000720 | 0000 0000 0000 0000 0000 0000 0000 0000 | ⎪ |
| 00000740 | 0000 0000 0000 0000 0000 0000 0000 0000 | ⎭ |
| 00000760 | 0000 0000/6465 7363 0000 0000 0000 0007 | ⎫ |
| 00001000 | 5361 6d70 6c65 0000 0000 0000 0000 00f e | ⎪ |
| 00001020 | f f 00 5300 6100 6d00 7000 6c00 6500 0000 | ⎪ |
| 00001040 | 0007 5361 6d70 6c65 0006 0000 0000 0000 | ⎬ 112 |
| 00001060 | 0000 0000 0000 0000 0000 0000 0000 0000 | ⎪ |
| 00001100 | 0000 0000 0000 0000 0000 0000 0000 0000 | ⎪ |
| 00001120 | 0000 0000 0000 0000 0000 0000 0000 0000 | ⎭ |
| 00001140 | 0000 0000 0000 0000/7465 7874 0000 0000 | ⎫ |
| 00001160 | 436f 7079 7269 6768 7428 4329 2046 756a | ⎪ |
| 00001200 | 6974 7375 204c 5444 2e20 616e 6420 4675 | ⎬ 113 |
| 00001220 | 6a69 7473 7520 4c61 626f 7261 746f 7269 | ⎪ |
| 00001240 | 6573 204c 5444 2e20 3139 3938 0000 0000 | ⎭ |
| 00001260 | 5859 5a20 0000 0000 0000 edf 7 0001 0000 | ← 114 |
| 00001300 | 0001 4338/5859 5a20 0000 0000 0000 63cd | ← 115 |
| 00001320 | 0000 347e 0000 02d4/5859 5a20 0000 0000 | ← 116 |
| 00001340 | 0000 584f 0000 b08b 0000 1240/5859 5a20 | ← 117 |
| 00001360 | 0000 0000 0000 3ab8 0000 1af 5 0000 be25 | ← 118 |
| 00001400 | 6375 7276 0000 0000 0000 0003 0000 4000 | ← 119 |
| 00001420 | f f f f 0000/6375 7276 0000 0000 0000 0003 | ← 120 |
| 00001440 | 0000 4000 f f f f 0000/6375 7276 0000 0000 | |
| 00001460 | 0000 0003 0000 4000 f f f f | |

(Left brace grouping rows into section 2 covers addresses 00000420 through 00001460)

DISPLAY CHARACTERISTICS RECOGNITION APPARATUS, DISPLAY CHARACTERISTICS RECOGNITION PROGRAM STORAGE MEDIUM, COMPUTER SYSTEM, DISPLAY CHARACTERISTICS ADJUSTING APPARATUS AND DISPLAY CHARACTERISTICS ADJUSTING PROGRAM STORAGE MEDIUM

BACKGROUND OF THE INVENTION

1. Field of the Invention

The present invention relates to a display characteristics recognition apparatus for determining display characteristics of a display unit, a display characteristics recognition program storage medium storing a display characteristics recognition program which causes a computer system to operate as such a display characteristics recognition apparatus, a computer system operative as such a display characteristics recognition apparatus, a display characteristics adjusting apparatus for adjusting display characteristics of the display unit, a display characteristics adjusting program storage medium storing a display characteristics adjusting program which causes a computer system to operate as such a display characteristics adjusting apparatus, and a computer system operative as such a display characteristics adjusting apparatus.

2. Description of the Related Art

Recently, in view of the fact that a high performance personal computer comes into wide use and the cost of image input and output units, such as a scanner and a color printer, is decreased, there is increased an opportunity that a color image is dealt with in the form of a home use as well as a business use. As an opportunity of processing a color image for a home use is increased, a problem of a color reproduction quality arises. Specifically, there is associated with such a problem that it is difficult to reproduce a color of an image on the same basis among images such as an original image, a display image on a display, and a print image of a printer. The reason why it is so is that different color input and output units such as a display unit, a printer and a scanner are mutually different in their color developing mechanism and color characteristics of color reproduction areas and the like.

As a technology of adjusting a color in appearance for those different color input and output units, there is known a color management system (CMS). The use of the CMS makes it possible to establish a matching of a color in appearance between an image read through a scanner and an image displayed on a display, and also establish a matching of a color in appearance between an image formed through printing by a printer and an image read through a scanner or an image displayed on a display. Thus, the use of the CMS makes it possible to establish a system in which a user does not feel that something is wrong with an image.

Today, as in ICM 1.0(Image Color Matching) of Windows 95 and Color Sync 2.0 of Macintosh, which are registered trade mark, the CMS is incorporated in the operating system (OS) level. An offer of a predetermined type of device profile used in ICM 1.0 or Color Sync 2.0 to a user by a maker of color input and output units makes it possible that the user obtains an image with which the user does not feel something is wrong, even between images of different devices, for example, a displayed image on a display and a printed image by a printer. The device profile of ICM 1.0 and Color Sync 2.0 is based on the ICC (International Color Consortium) profile advocated by the ICC. Consequently, an offer of the device profile according to the specification of the ICC by a maker of color input and output units makes it possible that both the users of the Windows environment and the Macintosh environment obtain an image with which both the users do not feel something is wrong, even between images of different devices. Thus, it is possible to use various color input and output units without something wrong with a color in appearance. Hereinafter, there will be described a case where the CMS is used for an output unit.

Currently, in the event that the CMS is used in a computer environment, it is general that color display characteristics of an output unit is grasped, and an ICC profile including information indicative of the color display characteristics is adopted.

FIG. 1 is a schematic diagram of an ICC profile.

In the ICC profile, all the necessary data are described by tags. The ICC profile is divided into three parts of a profile header 1 for storing information as to the profile per se such as a file size and a making out date, information indicative of kinds of objective machines (output units), a tagged element data 2 storing information indicative of color display characteristics of an output unit, and a tag table 3 indicative of stored information and storage address of the stored information in the tagged element data 2. The profile header 1 is a fixed length of data. The tagged element data 2 is a variable length of data. The tag table 3 is a variable length of data of (4+12n) bytes including data 3a representative of the number of tags (n) stored in the tagged element data 2, and data 3b, 3c and 3d representative of an identifier, a storage address, a size on each of n pieces of tag, respectively, each of the data 3b, 3c and 3d consisting of 4 bytes.

In the tagged element data 2, a CIEXYZ value of white is stored, as standard white information of the output unit, in wtpt tag with a standardized value in which D50 is adopted as a standard light source. As the standard white information of the output unit, there is known a color temperature indicating white in accordance with a blackbody radiation other than the CIEXYZ value of white. Here, the CIEXYZ value of white is stored in the tagged element data 2. It is possible to perform a transformation between the CIEXYZ value of white and the color temperature in accordance with the conventional scheme. In the following explanation, it happens that the CIEXYZ value of white and the color temperature are used without distinction.

In the tagged element data 2, CIEXYZ values of red, green and blue are stored, as information indicative of a range of color capable of reproduction by the output unit, in rXYZ tag, gXYZ tag and bXYZ tag, respectively, with a standardized value in which D50 is adopted as a standard light source.

Further, in the tagged element data 2, input-output characteristics ($\gamma$-characteristics) of the output unit of red, green and blue are stored, as information indicative of $\gamma$-characteristics, in rTRC tag, gTRC tag and bTRC tag, respectively, and in general, gradation values are stored where a range between an input 0 and the maximum input is divided into n equal parts.

In this manner, it is general that the tagged element data 2 of the ICC profile of the display unit stores seven sorts of information as mentioned above. Those sorts of information are obtained through such a manner that a specific color image data is inputted to a display or the like so that a color image is displayed, and the color is measured through the use of a dedicated measuring apparatus (a color measuring apparatus).

The ICC profiler is provided nowadays from a color equipment maker to a user in conjunction with a product. Since a color equipment is associated with a difference in display due to a difference among types of the equipment per se and a usage environment, the ICC profile provided by a maker does not always have characteristics of the equipment used by the user. For example, in case of a display, it often happens that a difference in color display characteristics occurs owing to a production lot and a user sets up a display state of a display by a regulatory function (contrast, brightness, RGB balance, color temperature setting) so as to meet the user's desire, and thus usually, the display profile provided by a maker is not suitable for a display which is actually used by a user. In other words, in the CMS, it is difficult to implement a fine color matching with another color equipment. In order to implement a fine color matching, there is a need that a display of a user is measured to collect information data for color display characteristics of the display so that the profile is produced in accordance with the collected information data. However, as mentioned above, for a measurement of a display there is a need to prepare a dedicated measuring apparatus. Such a dedicated measuring apparatus is expensive and thus it is generally that a user has no such measuring apparatus. For this reason, generally, a user cannot produce an ICC profile through a determination of display characteristics of a display unit, and cannot regulate the display characteristics of the display unit.

SUMMARY OF THE INVENTION

In view of the foregoing, it is an object of the present invention to provide a display characteristics recognition apparatus capable of determining display characteristics of a display unit even for a general user having no color measuring apparatus as mentioned above, a display characteristics recognition program storage medium storing a display characteristics recognition program which causes a computer system to operate as such a display characteristics recognition apparatus, a computer system operative as such a display characteristics recognition apparatus, a display characteristics adjusting apparatus capable of adjusting display characteristics of the display unit even for a general user having no color measuring apparatus as mentioned above, a display characteristics adjusting program storage medium storing a display characteristics adjusting program which causes a computer system to operate as such a display characteristics adjusting apparatus, and a computer system operative as such a display characteristics adjusting apparatus.

To achieve the above-mentioned objects, the present invention provides a display characteristics recognition apparatus comprising:

signal output means connected to a display unit for displaying an image according to a signal entered, said display unit displaying the image with a color according to both the signal and display characteristics of said display unit, said signal output means outputting a color chart signal representative of a monochrome figure to said display unit;

color name input means for entering a name of a color displayed on said display unit in accordance with the color chart signal outputted from said signal output means; and display characteristics identification means for determining display characteristics of said display unit in accordance with the color chart signal outputted from said signal output means and the name of the color entered through said color name input means.

Here the "monochrome figure" is not restricted to the figure of a primary color according to a color developing principle of a display unit. Any one is acceptable, as the "monochrome figure", which is a single color of figure on a visual basis.

According to the display characteristics recognition apparatus of the present invention, display characteristics is determined by the display characteristics identification means when a user enters a name of a color through the color name input means. Thus it is possible for a general user, who has no dedicated color measuring apparatus, to determine display characteristics.

In the display characteristics recognition apparatus according to the present invention as mentioned above, it is acceptable that said display characteristics identification means determines, as the display characteristics, a relationship between a signal representative of a white image and a color of an image displayed on said display unit in accordance with the signal. In such a display characteristics recognition apparatus according to the present invention, it is preferable that said display unit is selectively set up to any one of a plurality of display characteristics, and said display characteristics identification means determines display characteristics to which said display unit is now set up.

A relationship between a signal representative of a white image and a color of an image displayed on said display unit in accordance with the signal is indexed, for example, with a temperature in accordance with a blackbody radiation, and the temperature is referred to as a color temperature. It is general that the color temperature of a display unit is selectively set up from among typical color temperatures, for example, 5000K, 6500K, 9300K. And as to accuracy of a decision of the color temperature, in many cases, it is sufficient that it can be determined as to whether the color temperature set up on the display matches with the actual color temperature. Therefore, it is possible to determine display characteristics simply and exactly through a decision of the color temperature as to which a color temperature is set up of those typical color temperatures.

In the display characteristics recognition apparatus according to the present invention as mentioned above, it is acceptable that said display unit is a display in which an image is displayed through emission of light, and said display characteristics identification means determines, as the display characteristics, luminance of said display.

Further, in the display characteristics recognition apparatus according to the present invention as mentioned above, it is preferable that said signal output means outputs such a color chart signal that a color of an adjacent area as to colors adjacent to one another on a chromaticity diagram of a plurality of colors perceived as mutually different colors in name is displayed in chromaticity according to display characteristics.

The color displayed on the display unit in accordance with the color chart signal outputted from the signal output means is great in accuracy of display characteristics determined on the basis of a name of a color, since variation of a color to variation of display characteristics is extremely sensitive for human visual sensation, which will be described later in details.

Further, in the display characteristics recognition apparatus according to the present invention as mentioned above, it is preferable that said color name input means enters a name of a color selected from among a plurality of colors perceived as mutually different colors in name.

According to the above-mentioned preferable display characteristics recognition apparatus, the number of choices for a name of a color to be inputted to the color name input means is reduced.

Furthermore, in the display characteristics recognition apparatus according to the present invention as mentioned above, it is preferable that said signal output means outputs a plurality of color chart signals each representative of a monochrome figure to said display unit;

said color name input means enters a name of a color of each of a plurality of monochrome figures; and said display characteristics identification means determines display characteristics of said display unit in accordance with the plurality of color chart signals outputted from said signal output means and the plurality of names of the color entered through said color name input means. In the display characteristics recognition apparatus, it is preferable that said signal output means outputs one of the plurality of color chart signals, and thereafter outputs, of the plurality of color chart signals, a color chart signal according to the name entered through said color name input means to said display unit.

According to such a preferable display characteristics recognition apparatus, display characteristics is determined in accordance with a plurality of color chart signals and a plurality of names of color. Thus, it is possible to determine display characteristics with greater accuracy.

Still furthermore, in the display characteristics recognition apparatus according to the present invention as mentioned above, it is preferable that said signal output means outputs the color chart signal to said display unit, and in addition outputs to said display unit a signal causing black to be displayed around the monochrome figure displayed on said display unit according to the color chart signal.

And it is preferable that said signal output means outputs the color chart signal to said display unit, and in addition outputs to said display unit a signal causing gray to be displayed around the monochrome figure displayed on said display unit according to the color chart signal and further causing black to be displayed around the gray.

According to such a preferable display characteristics recognition apparatus, an achromatic color is displayed around the monochrome figure displayed on said display unit. Thus, a pure color of the monochrome figure is perceived by a user and the name of the color is entered, and thereby determining display characteristics with great accuracy. Further, for example, as in a liquid crystal display, in the event that there is a need to avoid leaked light from the periphery of the monochrome figure, it is preferable that black is displayed around the monochrome figure. As will be described later, in the event that there is a need to unify a mode of color appearance to a surface color mode, it is preferable that gray is displayed around the monochrome figure.

In the display characteristics recognition apparatus according to the present invention as mentioned above, it is acceptable that said signal output means outputs a series of color chart signals such that a series of colors in adjacent areas for two sorts of colors adjacent to one another on a chromaticity diagram are displayed, and said color name input means selects a color corresponding to a boundary of the two sorts of colors from among the displayed series of colors.

Further in the display characteristics recognition apparatus according to the present invention as mentioned above, it is preferable that said display characteristics recognition apparatus further comprises profile producing means for generating data representative of display characteristics determined by said display characteristics identification means in a predetermined format to produce a profile representative of characteristics as to display of an image by said display unit including the data.

Furthermore, in the display characteristics recognition apparatus according to the present invention as mentioned above, it is preferable that said display characteristics recognition apparatus further comprises:

profile storage means for storing various sorts of profiles each representative of characteristics as to display of an image by a display unit including data indicative of various display characteristics in a common format; and profile selection means for selecting one profile from among the various sorts of profiles stored in said profile storage means in accordance with the display characteristics determined by said display characteristics identification means.

According to the display characteristics recognition apparatus having the profile producing means and the profile selection means, there is determined a profile suitable for the display unit. Thus, it is possible to implement by the CMS matching between appearance of color displayed on the display unit and appearance of color displayed on another display unit.

To achieve the above-mentioned objects, the present invention provides a display characteristics recognition program storage medium storing a display characteristics recognition program comprising:

signal output means connected to a display unit for displaying an image according to a signal entered, said display unit displaying the image with a color according to both the signal and display characteristics of said display unit, said signal output means outputting a color chart signal representative of a monochrome figure to said display unit;

color name input means for entering a name of a color displayed on said display unit in accordance with the color chart signal outputted from said signal output means; and display characteristics identification means for determining display characteristics of said display unit in accordance with the color chart signal outputted from said signal output means and the name of the color entered through said color name input means.

To achieve the above-mentioned objects, the present invention provides a first computer system comprising:

a display unit for displaying an image according to a signal entered, said display unit displaying the image with a color according to both the signal and display characteristics of said display unit;

a main frame unit for outputting to said display unit a color chart signal representative of a monochrome figure and color name signals, which are representative of a plurality of color names, respectively; and input unit for entering a color name selected from among said plurality of color names to said main frame unit in accordance with an operation, wherein said main frame unit determines display characteristics of said display unit in accordance with the color chart signal outputted toward said display unit and the color name entered through said input unit.

To achieve the above-mentioned objects, the present invention provides a second computer system comprising:

a display unit for displaying an image according to a signal entered, said display unit displaying the image with a color according to both the signal and display characteristics of said display unit;

a main frame unit for outputting to said display unit a series of color chart signals such that a series of colors in adjacent areas for two sorts of colors adjacent to one another on a chromaticity diagram are displayed; and input unit for entering a color corresponding to a boundary of the two sorts of colors, which is selected from among the series of colors displayed on said display unit, to said main frame unit in accordance with an operation, wherein said main frame unit determines display characteristics of said display unit in accordance with the color chart signal outputted toward said display unit and the color entered through said input unit.

In the second computer system, it is preferable that said main frame unit outputs to said display unit the series of color chart signals, and in addition a message signal representative of a message inquiring as to from which color of the series of colors displayed on said display unit an operator visually identifies it as a color of a specified color name.

To achieve the above-mentioned objects, the present invention provides a third computer system comprising:

a display unit for displaying an image according to a signal entered, said display unit displaying on a luminous display basis the image with a color according to both the signal and display characteristics of said display unit;

a main frame unit for outputting to said display unit color chart signals representative of a plurality of monochrome figures associated with mutually different luminance of said display unit, each of the plurality of monochrome figures being displayed with a color of a specified color name under an associated luminance; and input unit for selectively entering a monochrome figure displayed with a color of the specified color name of the plurality of monochrome figures displayed on said display unit, to said main frame unit in accordance with an operation, wherein said main frame unit determines luminance of said display unit in accordance with the color chart signal outputted toward said display unit and the monochrome figure entered through said input unit.

In the third computer system, it is preferable that said main frame unit outputs color chart signals representative of a plurality of monochrome figures associated with mutually different luminance of said display unit, each of the plurality of monochrome figures being displayed with such a color that persons of a predetermined ratio and up recognize it as the color of the specified color name under an associated luminance.

Further, to achieve the above-mentioned objects, the present invention provides a display characteristics adjusting apparatus for adjusting display characteristics of a display unit for displaying an image according to a signal entered, said display unit displaying the image with a color according to both the signal and display characteristics of said display unit, said display characteristics adjusting apparatus comprising:

signal output means for outputting to said display unit such a color chart signal that a color belonging to an adjacent area as to colors adjacent to one another on a chromaticity diagram of a plurality of colors perceived as mutually different colors in name is displayed on said display unit in accordance with display characteristics of said display unit.

According to the display characteristics adjusting apparatus of the present invention as mentioned above, a color displayed on a display unit in accordance with the color chart signal can be adjusted suitably in display characteristics using the variation of color as a criterion, since variation of a color to variation of display characteristics is extremely sensitive for human's visual sensation, which will be described later in details.

Furthermore, to achieve the above-mentioned objects, the present invention provides a display characteristics adjusting program storage medium storing a display characteristics adjusting program incorporated into a computer system, said display characteristics adjusting program causing said computer system to operate a display characteristics adjusting apparatus for adjusting display characteristics of a display unit for displaying an image according to a signal entered, said display unit displaying the image with a color according to both the signal and display characteristics of said display unit, said display characteristics adjusting program comprising:

signal output means for outputting to said display unit such a color chart signal that a color belonging to an adjacent area as to colors adjacent to one another on a chromaticity diagram of a plurality of colors perceived as mutually different colors in name is displayed on said display unit in accordance with display characteristics of said display unit.

To achieve the above-mentioned objects, the present invention provides a fourth computer system comprising:

a display unit for displaying an image according to a signal entered, said display unit displaying the image with a color according to both the signal and display characteristics of said display unit;

adjusting means for adjusting display characteristics of said display unit in accordance with an operation; and a main frame unit for outputting to said display unit such a color chart signal that a color belonging to an adjacent area as to colors adjacent to one another on a chromaticity diagram of a plurality of colors perceived as mutually different colors in name is displayed on said display unit in accordance with display characteristics of said display unit.

Incidentally, in the display characteristics recognition apparatus and the display characteristics adjusting apparatus, and the display characteristics recognition program and the display characteristics adjusting program of the present invention, the same name such as signal output means is applied to the structural element for those apparatus and programs. In case of the display characteristics recognition apparatus and the display characteristics adjusting apparatus, it indicates a combination of the software and the hardware having such a function. On the other hand, in case of the display characteristics recognition program and the display characteristics adjusting program, it indicates only the software having such function.

BRIEF DESCRIPTION OF THE DRAWINGS

FIG. 14 is a view showing a concrete example of an ICC-profile.

DETAILED DESCRIPTION OF PREFERRED EMBODIMENTS

First, prior to embodiments of the present invention, there will be described a principle of the present invention, hereinafter. It is noted that there will be described an example in a case where a display is used in a display unit.

Figure 1:
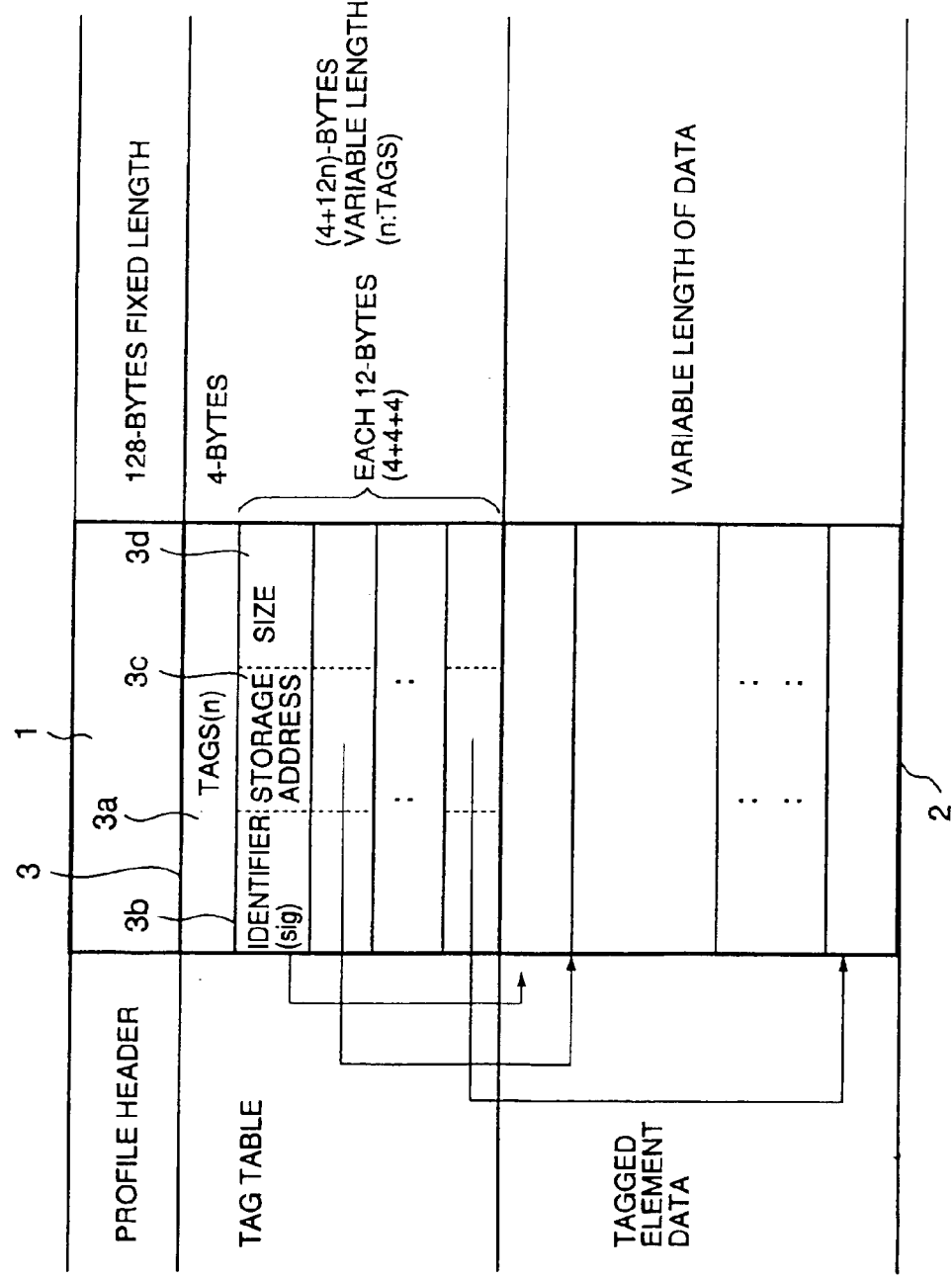
FIG. 1 is a schematic diagram of an ICC profile.
Figure 2:
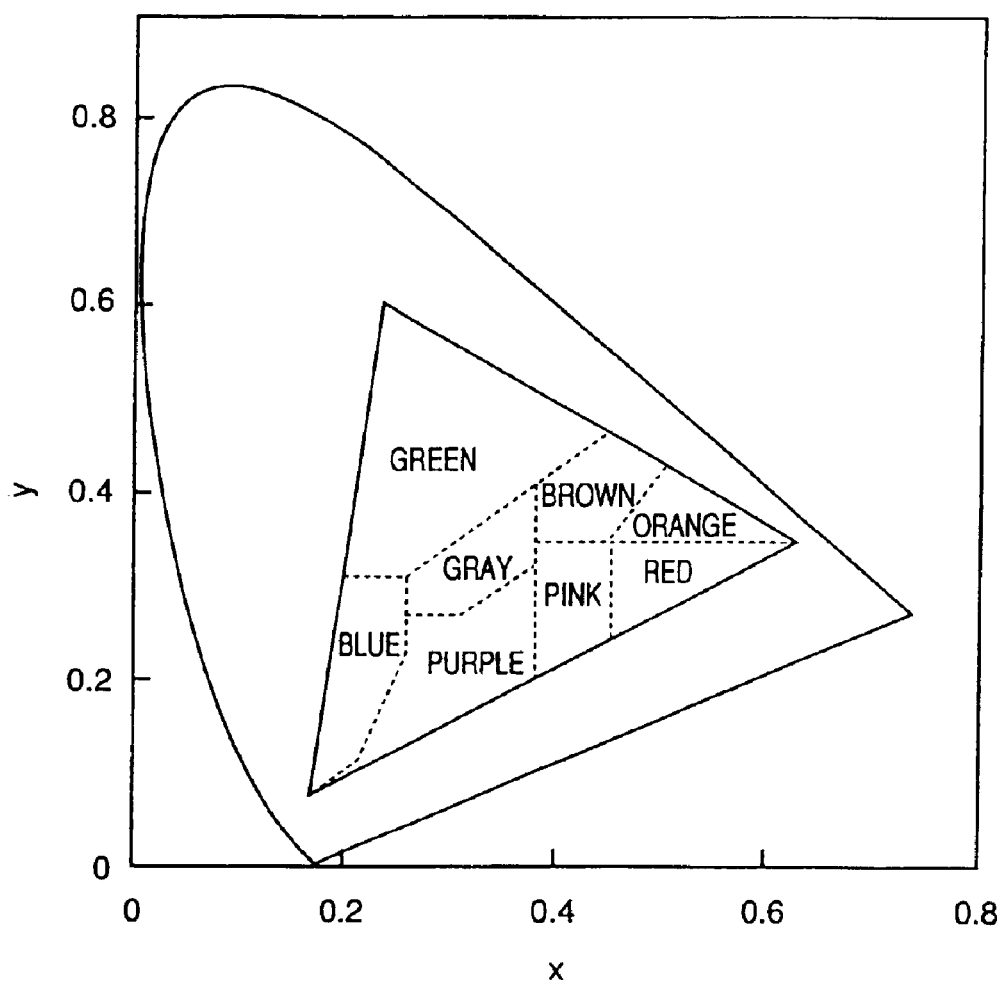
FIG. 2 is a chromaticity diagram showing a distribution of colors which are perceived by a human.

FIG. 2 is a chromaticity diagram showing a distribution of colors which are perceived by a human.

The axis of abscissas and the axis of ordinates denote a so-called xy chromaticity value in which CIEXYZ value (X, Y, Z) is normalized with relational expressions of x=X/(X+Y+Z), y=Y/(X+Y+Z). In a case where lightness is not considered, one point on the chromaticity diagram denotes one color. A triangular domain 10 shown in the chromaticity diagram is an area of colors which can be reproduced by a display. Tops of the triangle denote colors displayed by a display in the event that RGB values entered to the display are (0, 0, 255), (0, 255, 0), (255, 0, 0), respectively. A wide region 20 covering the triangular domain 10 is an area of colors which can be perceived by a human.

As one which is indicative of powers of perception of human for colors, there is known a perception method referred to as the categorical color perception. According to the categorical color perception, it is said that colors perceived by a human are perceived through a classification of 11 to 13 colors or so regardless of a race, a region and nationality. Hereinafter, there will be explained by way of example a case where colors perceived by a human are perceived through a classification of 11 colors. 11 colors designated by the categorical color perception are "white", "orange", "brown", "gray", "yellow", "purple", "pink", "red", "green", "blue" and "black". According to the chromaticity diagram shown in FIG. 2, the triangular domain 10 is partitioned in color domain into 8 colors of blue, green, brown, orange, red, pink, purple, and gray. These eight domains 11, 12, 13, 14, 15, 16, 17 and 18 are referred to as categorical areas, hereinafter. The categorical area 18 of "gray" of the chromaticity diagram includes "white" and "black". While the chromaticity diagram omits the categorical area of "yellow", in view of the lightness, the categorical area of "yellow" exists between the categorical area 12 of "green" and the categorical area 13 of "brown". The chromaticity diagram shown in FIG. 2 was made referring to "A categorical color name area of a color space in an aperture color mode and a surface color mode" (Keiji UTIKAWA, et al.: Journal of Society of Illumination, Vol. 77, No. 6, pp 346–354). A human has such a characteristic that even if various sorts of colors, which are mutually different in CIEXYZ values and the like, are concerned, in the event that those colors belong to a certain categorical area on the chromaticity diagram, those colors are categorized and regarded as the same sort of color. In other words, even if colors, which are located mutually near on the chromaticity diagram, are concerned, in the event that those colors belong to mutually different categorical areas on the chromaticity diagram, those colors are regarded as the different sort of color.

By the way, between RGB values entered to a display and CIEXYZ values of a color displayed on the display, there is provided a relation approximated by the following relational expression.

$$\begin{pmatrix} X_R & X_G & X_B \\ Y_R & Y_G & Y_B \\ Z_R & Z_G & Z_B \end{pmatrix} \begin{pmatrix} R^{\gamma R} \\ G^{\gamma G} \\ B^{\gamma B} \end{pmatrix} = \begin{pmatrix} X \\ Y \\ Z \end{pmatrix} \quad (1)$$

where R, G, B denote RGB values entered to the display, and $X_R$, $Y_R$, $Z_R$ denote CIEXYZ values of red, $X_G$, $Y_G$, $Z_G$ denote CIEXYZ values of green, and $X_B$, $Y_B$, $Z_B$ denote CIEXYZ values of blue. $\gamma_R$, $\gamma_G$, $\gamma_B$ denote $\gamma$ coefficient. X, Y, Z denote CIEXYZ values of an output.

It is known that when a color temperature of the display is changed, the values, which constitute a matrix shown at the left side of the relational expression (1), are changed, and as a result, a constructive ration of CIEXYZ values of a color displayed on the display is changed. This means that even if RGB values entered to the display are constant, a change of the color temperature causes a color displayed on the display to be seen differently. When the color temperature is decreased, white becomes reddish and blue becomes purplish.

Also a change of a display luminance causes a color to be seen differently. With respect to a relation between a brightness of a color and an appearance of a color, Bezold-Brücke Effect is known. According to Bezold-Brücke Effect, when intensity of the color light (luminance) is increased, a tinge of blue or yellow of chromatic color other than blue, green, yellow and red is increased, and oppositely when intensity of the color light is decreased, a tinge of green or red is increased.

In this manner, even in the event that the same color data (RGB values) are entered to the display, a color displayed on the display is seen differently in accordance with a color temperature of the display and a display luminance of the display. As a result, for example, in the even that an xy chromaticity value of a color displayed on the display according to a certain RGB value X is within a categorical area of blue in a certain color temperature $CT_1$, and is located within a categorical area of purple in a different color temperature $CT_2$, a user of the display will recognize it as different colors in both the cases. Thus, it is possible to decide whether the present color temperature is the certain color temperature $CT_1$ or the color temperature $CT_2$ according as the user recognizes the displayed color as blue or purple when the RGB value X is entered and displayed. In effect, the RGB value X and the associated display color can be used as a criterion for identifying a color temperature of the display. Likely, also in the event that a luminance is determined, it is possible to determine the luminance, according as a user recognizes a displayed color as what color when a certain RGB value is entered and displayed as a criterion. In the following description, both the RGB value used as the criterion and the figure displayed with the associated display color are referred to as a "color chart" without a distinction therebetween. A display color near the boundary of the mutually adjacent categorical areas is seen extremely differently in accordance with a change of a display setting (for example, a color temperature, a display luminance). Thus, it is recommended that such an RGB value is used as the color chart. Hereinafter, there will be shown examples of the color chart.

As an example of the color chart for determining a color temperature through an appearance of a display color, there is considered a color near the boundary between the categorical areas of, for example, blue and purple. Specifically, a display color of a monochromatic figure wherein an RGB value is (R,G,B)=(75, 0, 255) is located in an area of purple in the event that the color temperature is 5000K, and moves to an area of blue at 9300K. Thus, such an RGB value is preferable as the color chart for determining a color temperature.

Figure 3A:
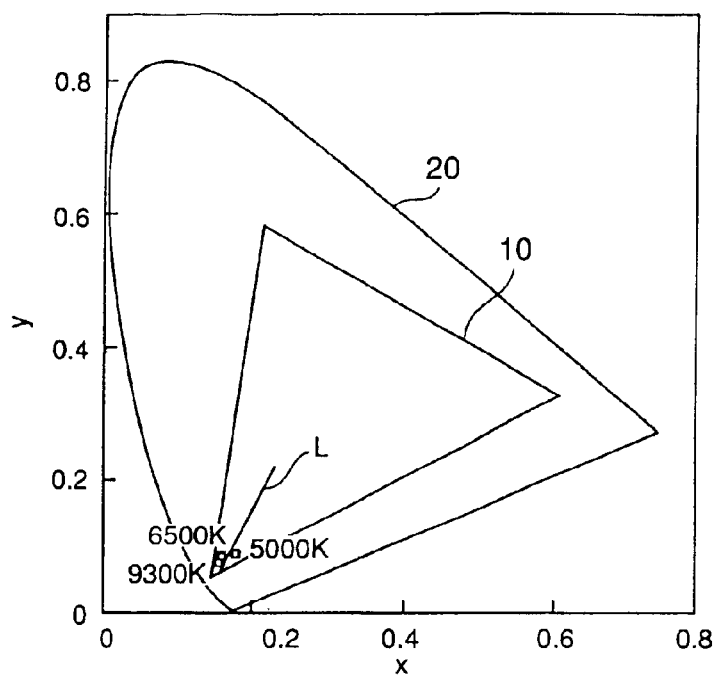
FIG. 3(A) is an xy-chromaticity diagram showing a measurement result of a display color.
Figure 3B:
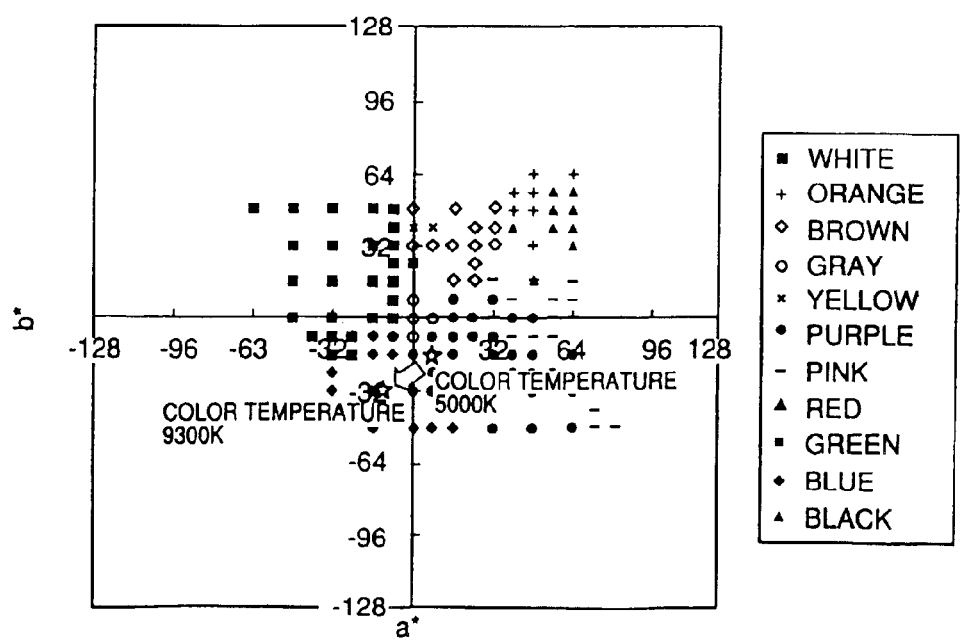
FIG. 3(B) is a chromaticity diagram of CIELAB space.

FIGS. 3(A) and 3(B) and Table 1 show a measurement result of a display color in which a color chart wherein an RGB value is (R,G,B)=(75, 0, 255) is displayed and the displayed color is measured by a measuring apparatus.

TABLE 1

|  | X | Y | Z | x | y |
|---|---|---|---|---|---|
| 5000K | 7.11 | 3.55 | 28.56 | 0.181285 | 0.090515 |
| 6500K | 13.53 | 6.54 | 61.78 | 0.165302 | 0.079902 |
| 9300K | 19.22 | 9.1 | 93.51 | 0.157761 | 0.074694 |

X, Y and Z columns of Table 1 show measured values of CIEXYZ values of the respective display colors wherein a color temperature is 5000K, 6500K and 9300K. x and y columns of Table 1 show xy-chromaticity values calculated from the measured values of the CIEXYZ values.

FIG. 3(A) is an xy-chromaticity diagram showing the measurement result in Table 1. FIG. 3(B) is a chromaticity diagram of CIELAB space.

FIG. 3(A) is an xy-chromaticity diagram which is similar to FIG. 2, in which a domain 10 of colors which can be reproduced by a display and a domain 20 of colors which can be perceived by a human are shown in a similar fashion to that of FIG. 2. In FIG. 3(A), the boundary between the categorical area of blue and the categorical area of purple is shown by a straight line L, and positions of the respective display colors wherein a color temperature is 5000K, 6500K and 9300K are shown on the chromaticity diagram with square marks together with the color temperature.

The axis of abscissas and the axis of ordinates of FIG. 3(B) denote a* value and b* value of the respective CIELABs, respectively. In FIG. 3(B) a distribution of eleven colors designated by the categorical perception is shown with eleven sorts of marks. Further, in FIG. 3(B), positions of the respective display colors wherein a color temperature is 5000K and 9300K are shown with star marks together with the color temperature.

From the measurement result shown in the chromaticity diagram, it is understood that the display color of the color chart wherein the RGB value is (R,G,B)=(75, 0, 255) belongs, in the event that the color temperature is 5000K, to the categorical area of purple, and belongs, in the event that the color temperature is 6500K and 9300K, to the categorical area of blue.

Here, there was conducted an experiment in which the color chart wherein the RGB value is (R,G,B)=(75, 0, 255) is displayed and the color temperature of the display is set up to 5000K and 9300K, test subjects raise the color name of the color chart on each of the color temperatures. This experiment result is shown in Table 2.

TABLE 2

| Color temperature | Purple | Blue |
|---|---|---|
| 5000K | 6 persons | 2 persons |
| 9300K | 0 persons | 8 persons |

As a result of the experiment, in the color temperature 9300K, six of eight persons answered that the color of the above color chart is "blue", and in the color temperature 5000K, six of eight persons answered that the color of the above color chart is "purple". And in both color temperatures 5000K and 9300K, two of eight persons answered that the color of the above color chart is "blue". While the same result cannot be obtained for all the test subjects, 75% persons answered that it is purple in the color temperature 5000K. Thus, in the event that "blue" is selected as the color name of the color chart wherein the RGB value is (R,G,B)=(75, 0, 255), it is decided that the color temperature is 9300K or so, and in the event that "purple" is selected as the color name, it is decided that the color temperature is 5000K or so. This way of identification makes it possible to identify the color temperature with accuracy of 75% as to whether the color temperature is 5000K or so or 9300K or so. The use of a plurality of color charts as mentioned above, but not only one color chart, makes it possible to determine the color temperature with greater accuracy.

Further, a color temperature and an RGB balance of the display are controlled in accordance with the display color of the color chart. This feature makes it possible to perform a more suitable adjustment.

Next, there will be explained embodiments of the present invention. First, there will be explained a first embodiment in which a color temperature of a display is determined to produce a profile.

Figure 4:
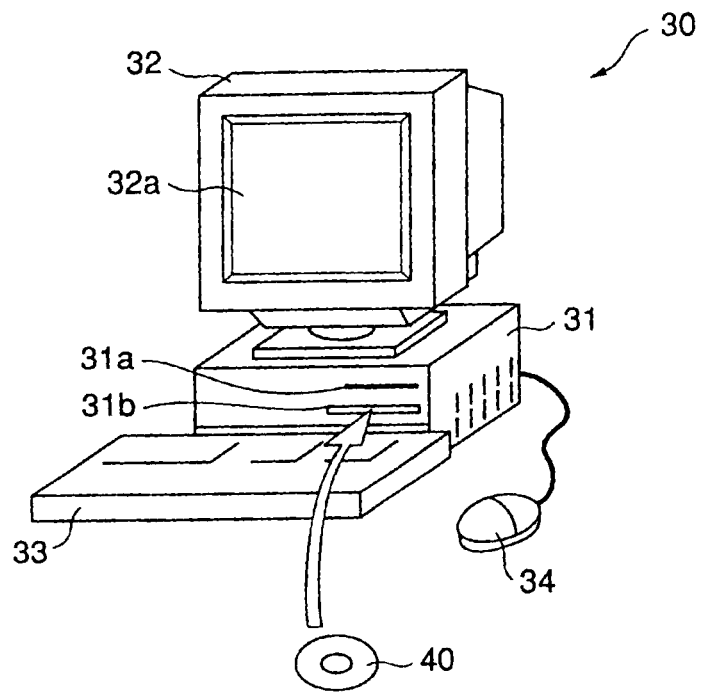
FIG. 4 is a view showing a first embodiment of a display characteristics recognition apparatus according to the present invention.

FIG. 4 is a view showing a first embodiment of a display characteristics recognition apparatus according to the present invention.

A display characteristics recognition apparatus 30, which is constructed in the form of a computer system, comprises: a main frame 31 incorporated thereinto a CPU, a RAM, a hard disk, a communication board, etc.; a CRT display 32 for performing a screen display on a fluorescent screen 32a in accordance with an instruction from the main frame 31; a keyboard 33 for entering character information and an instruction of an operator to the computer system; and a mouse 34 for entering an instruction according to an icon and the like displayed at an arbitrary position on the fluorescent screen 32a. The CRT display 32 is a part of the present embodiment and also an example of a display unit of which display characteristics are recognized in accordance with the present invention.

The main frame 31 is provided with a floppy disk loading aperture 31a adapted for loading a floppy disk and a CDROM loading aperture 31b adapted for loading a CDROM 40, and also incorporates therein a floppy disk driver for driving a loaded floppy disk and a CDROM driver for driving the loaded CDROM 40.

The CDROM 40 stores a display characteristics recognition program. When the CDROM 40 is loaded through the CDROM loading aperture 31b onto the main frame 31, the display characteristics recognition program stored in the CDROM 40 is installed into the hard disk of the computer system by the CDROM driver. When the display characteristics recognition program installed into the hard disk of the computer system is driven, the computer system is operative as a display characteristics recognition apparatus according to an embodiment of the present invention.

Therefore, the CDROM 40 storing a display characteristics recognition program corresponds to an embodiment of a display characteristics recognition program storage medium according to the present invention.

Further, the display characteristics recognition program stored in the CDROM 40 is installed in the hard disk of the computer system in accordance with the manner as mentioned above. The hard disk, in which the display characteristics recognition program is installed, also corresponds to an embodiment of a display characteristics recognition program storage medium according to the present invention.

Furthermore, in the event that the display characteristics recognition program is down loaded onto a floppy disk or the like, the floppy disk, which stores the display characteristics recognition program thus down loaded, also corresponds to an embodiment of a display characteristics recognition program storage medium according to the present invention.

Figure 5:
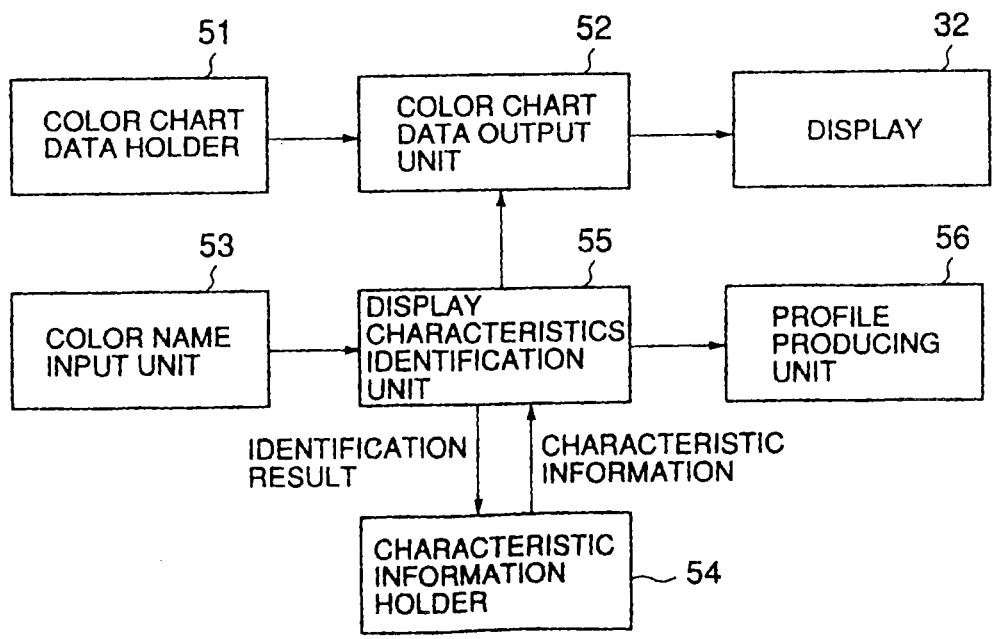
FIG. 5 is a functional block diagram of a display characteristics recognition apparatus (computer system).

FIG. 5 is a functional block diagram of a display characteristics recognition apparatus (computer system) which has an appearance shown in FIG. 4.

The display characteristics recognition apparatus shown in FIG. 5 comprises: a color chart data holder 51 for holding RGB data and the like for each of a predetermined number of color charts which is determined in accordance with a distribution and the like of categorical areas; and a color chart data output unit 52 for outputting data held in the color chart data holder 51 to the CRT display 32 shown in FIG. 4. The color chart data output unit 52 is an example of the color chart signal output unit referred to in the present invention. The color chart data holder 51 is, for example, a hard disk and a CDROM. The color chart data output unit 52 includes a so-called display card and a device driver. Here, it is not always needed that the color chart is held in the computer system, but it is acceptable, for example, that the computer system is connected to a network so that a color chart is properly transmitted from a remote server via the network.

The display characteristics recognition apparatus shown in FIG. 5 further comprises a color name input unit 53 for entering a name of a color of a color chart. A user sees a color chart displayed on the CRT display 32 to identify a color of the color chart, and operates the keyboard 33 and the mouse 34 to enter the name of the color.

The display characteristics recognition apparatus shown in FIG. 5 furthermore comprises: a characteristic information holder 54 for holding a plurality of characteristic information data which indicate several typical display characteristics (color temperatures) in the form of numerical values; and a display characteristics identification unit 55 for identifying one suitable as a color temperature of the display 32, of the typical color temperatures held in the characteristic information holder 54, in accordance with data of the color chart outputted from the color chart data output unit 52 and the name of the color entered through the color-name input unit 53. The display characteristics identification unit 55 is an example of the display characteristics identification means referred to in the present invention and serves to derive characteristic information data from the characteristic information holder 54 in accordance with an identification result. Further, the display characteristics identification unit 55 instructs the color chart data output unit 52 what color chart data is to be outputted in accordance with the name of the color entered through the color name input unit 53, so that an identification of the display characteristics is performed after the color chart data is outputted.

The display characteristics recognition apparatus shown in FIG. 5 still further comprises a profile producing unit 56 for producing a profile in accordance with characteristic information derived from the display characteristics identification unit 55. The profile producing unit 56 also derives information data, excepting information as to a color temperature, which is necessary for producing the profile, in accordance with a way which will be described later.

Figure 6:
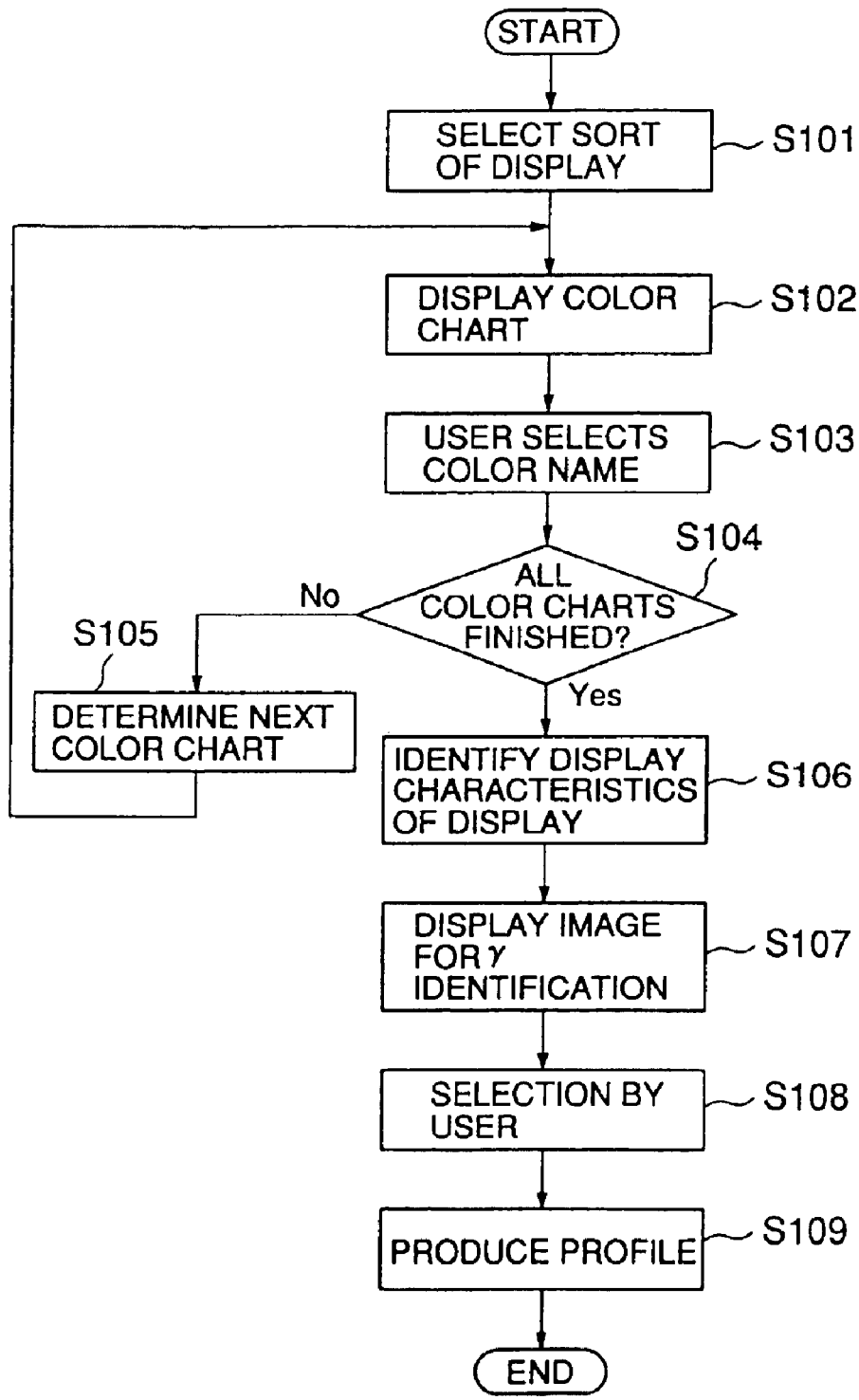
FIG. 6 is a flowchart useful for understanding an operating procedure of the first embodiment of the display characteristics recognition apparatus according to the present invention.

FIG. 6 is a flowchart useful for understanding an operating procedure of the first embodiment of the display characteristics recognition apparatus according to the present invention, as shown in FIGS. 4 and 5. Hereinafter, there will be explained the flowchart shown in FIG. 6 referring to FIGS. 7 to 14.

When the operation of the first embodiment of the display characteristics recognition apparatus is initiated, first, a CIEXYZ value (chromaticity value) on each color of red, green and blue, which is information indicative of a range of color reproducible by the color chart data output unit 52, is determined for production of the ICC profile. It is known that while the chromaticity values of red, green and blue greatly depend on a sort of a display such as a CRT and an LCD, but does not almost depend on a type of an apparatus. Therefore, it is sufficient for a determination of the chromaticity values of red, green and blue that a type of an apparatus is identified. While FIG. 4 shows the CRT display, there is a possibility that as a display of the computer system an LCD and a PDP are used other than the CRT display. According to the first embodiment of the display characteristics recognition apparatus, in step S101, a sort of a display is selected by a user to determine a chromaticity value according to the selected sort of the display.

Figure 7:
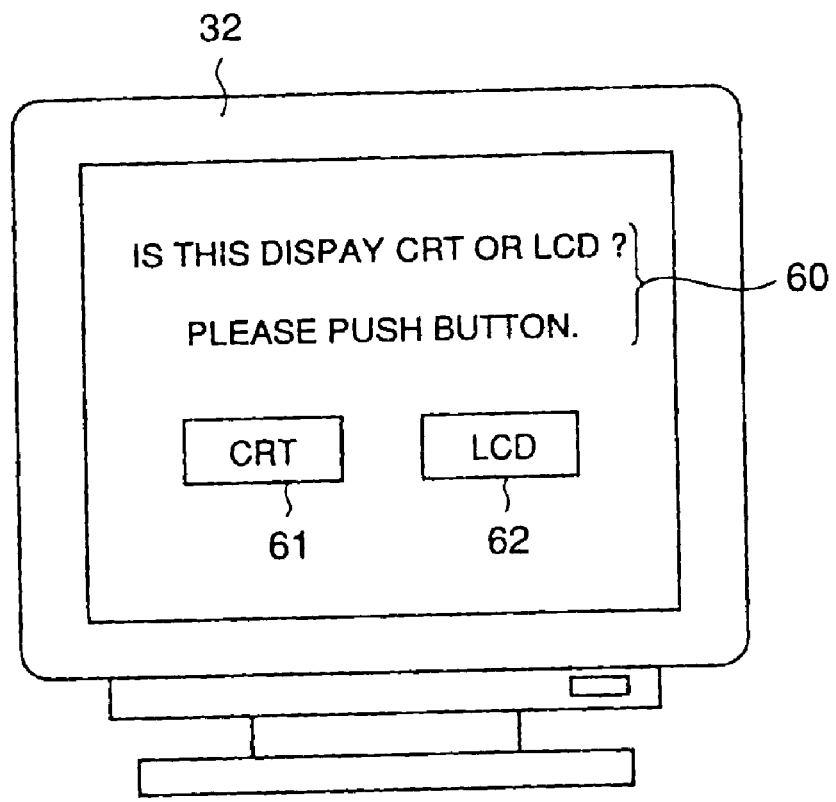
FIG. 7 is a view showing a display screen displayed on a display in a step S101 in FIG. 6.

FIG. 7 is a view showing a display screen displayed on the display in the step S101 in FIG. 6.

FIG. 7 shows a display screen 32 on which a character string 60 such as "Is this display CRT or LCD ?" and "Please push button" is displayed, and in addition a button 61 for selecting the CRT and a button 62 for selecting the LCD. Click of these buttons 61 and 62 may select the sort of the display.

FIG. 7 shows the display screen by way of example. When it is required that chromaticity values are determined with greater accuracy, it is acceptable that a user selects a type of an apparatus and designates a maker. Further, a dependency on a maker for a chromaticity value is greater on a case where an LCD is concerned as compared with a case where a CRT is concerned. In view of this matter, only in case of the LCD, a user may additionally designate a maker. Furthermore, in Windows 95 (registered trademark), there is provided an item storing information as to a display in a registry such as HKEY_LOCAL MACHINE/System/ CurrentControlSet/Services/class/monitor/0000. Thus, in order to meet Windows 95, it is acceptable that this registry is retrieved to derive the display name and it is determined whether the display is a CRT, an LCD or a PDP.

When a sort of a display is selected by a user, a color temperature is determined in steps S102 to S106 shown in FIG. 6 in accordance with the principle of the present invention as mentioned above. First, the process goes to the step S102 in which data held in the color chart data holder 51 shown in FIG. 5 is derived by the color chart data output unit 52 so that the associated color chart is displayed on the display.

Figure 8:
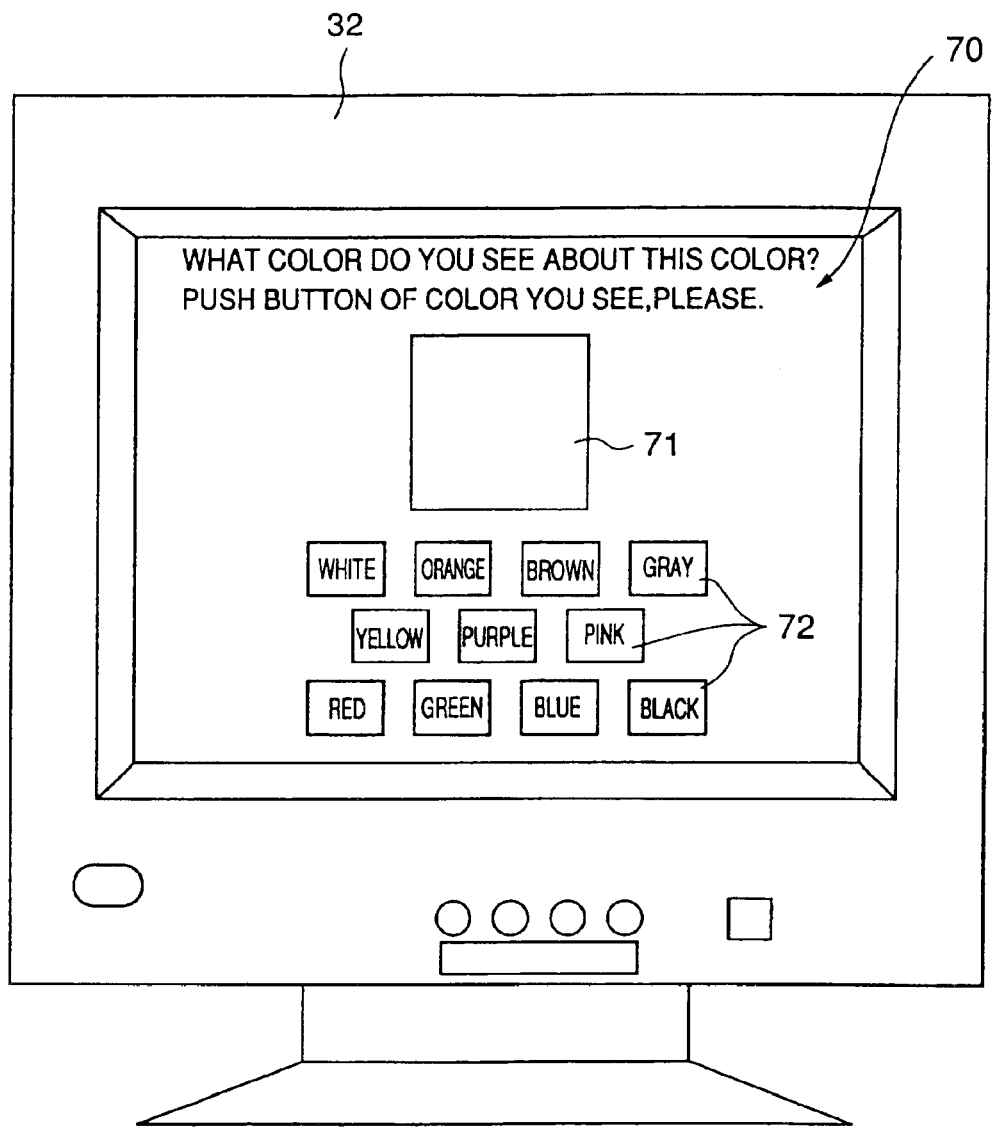
FIG. 8 is a view showing a state that a color chart is displayed on a display.

FIG. 8 is a view showing a state that a color chart is displayed on a display.

FIG. 8 shows the display 32 on which a character string 70 such as "What color do you see about this color ? Push button of color you see, please" is displayed at the top, a square color chart 71 is displayed at the center, and eleven buttons 72 for selecting a color name are displayed on the bottom. When any one of eleven buttons 72 is selectively clicked, a color name according to the color chart 71 is selected and entered to the color name input unit 53 shown in FIG. 5 (step S103). It is noted that only a part of these eleven buttons 72 is active in accordance with a sort of the displayed color chart. The reason why this is so is that for example, a color, which belongs to a categorical area of blue, may change to a color of the adjacent categorical area (green, white, gray, black, blue, purple), but may be difficult to be a color of a quite different categorical area (pink, red, yellow, brown). Thus, in the even that only a part of colors is active, the number of choices is reduced whereby a user's labor for choices is reduced.

As an input way of a color name, there is considered a method of entering an arbitrary color name by a user through a keyboard. In this case, there is prepared a dictionary indicative of a correspondence between the respective colors represented by the various color names and the categorical colors of the eleven colors. Thus, when the user enters any color name, the entered color name is rounded into any one of the categorical colors of the eleven colors, and it is understood that the one categorical color is selected. Further, there is considered an alternative method in which a series of color charts is displayed in such a manner that a series of colors across the adjacent two categorical areas is displayed, and a color chart corresponding to the boundary of the adjacent two categorical areas is selected.

Figure 9:
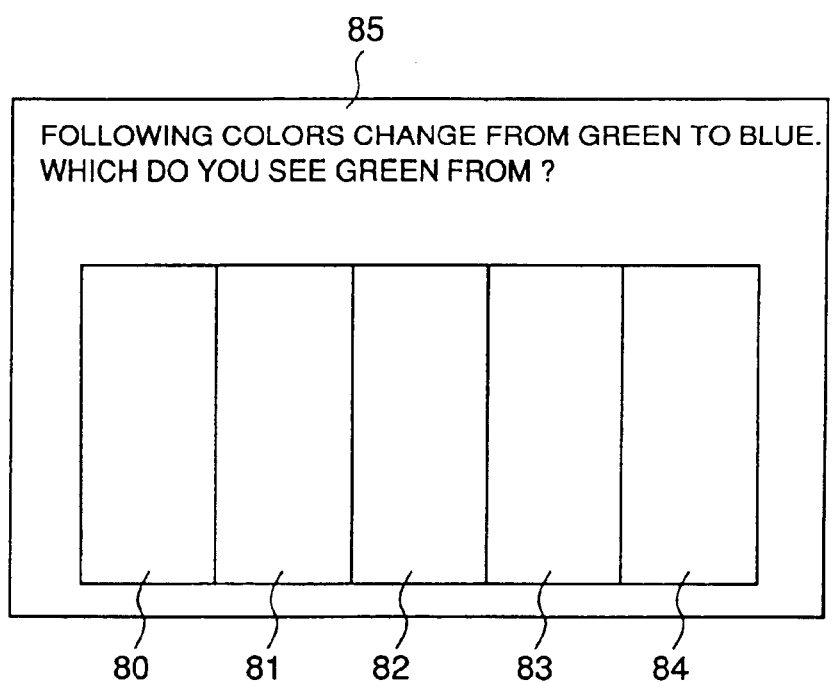
FIG. 9 is a view of a screen on which a series of color charts are displayed to select a color chart corresponding to the boundary.

FIG. 9 is a view of a screen on which a series of color charts are displayed to select a color chart corresponding to the boundary.

FIG. 9 shows five color charts 80, 81, 82, 83 and 84. Display colors of these five color charts 80, 81, 82, 83 and 84 are a series of colors from green to blue. Here, it is assumed that the more left side of the figure a color is nearer green, and the more right side of the figure a color is nearer blue. In the upper portion of FIG. 9, there is shown a character string 85 such as "Following colors change from green to blue. Which do you see green from?". In response to this question, a user clicks any one selected among the five color charts 80, 81, 82, 83 and 84. This click is equivalent to the matter that as color names of the respective color charts at the left side from the clicked color chart, green is entered and as color names of color charts excepting the former color charts, blue is entered.

By the way, it is preferable that the periphery of those color charts is black or gray.

Figure 10A:
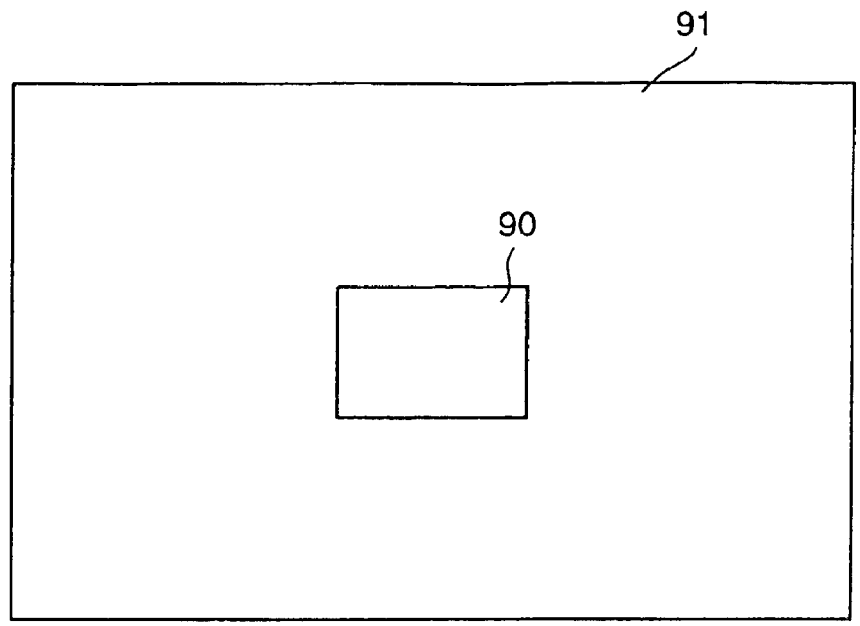
FIG. 10(A) is a view showing a case where the periphery of the color chart is black.
Figure 10B:
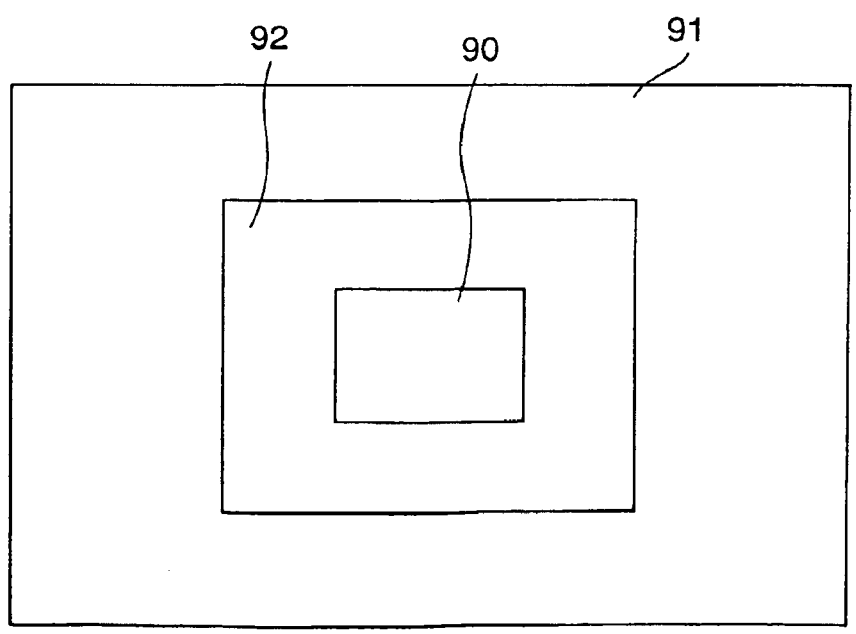
FIG. 10(B) is a view showing a case where the periphery of the color chart is gray.

FIG. 10(A) is a view showing a case where the periphery of the color chart is black, and FIG. 10(B) is a view showing a case where the periphery of the color chart is gray.

In FIG. 10(A), a color chart 90 is solely displayed at the center of a background 91 of the whole black. In FIG. 10(B), the color chart 90 is displayed with an edge 92 of gray.

As shown in FIG. 10(A), in the event that the color chart is solely displayed on the black background, the black background has no color interfering with a perception for colors. Thus, it is possible for a user to determine a color name in accordance with only an impression as to a display color of the color chart. Further, in this case, there is no occurrence of a reflection (leaked light on the display) by another color. Thus, it is possible for a user to observe a pure color of the color chart displayed on the display.

Also as shown in FIG. 10(B), even in the event that the color chart having the gray edge is displayed on the black background, since gray is achromatic color, it is possible for a user to determine a color name in accordance with only an impression as to a display color of the color chart.

By the way, in the event that a figure of monochrome is displayed on the black background, a person has sometimes an illusion that an aperture is provided on a surface of the display and the figure appears on the inner part of the aperture of the display, but the figure is not appended on the surface of the display. This is caused by the fact that the display performs a luminous display for colors. The looking way that the figure looks like being appended on the surface of the display is referred to a surface color mode for display. The looking way that an aperture is provided on a surface of the display and the figure appears on the inner part of the aperture of the display is referred to as an aperture color mode.

When the color chart is displayed as shown in FIG. 10(A), in some case, there is offered the aperture color mode, and in some case, there is offered the surface color mode. On the other hand, when the color chart is displayed as shown in FIG. 10(B), it is known that there is always offered the surface color mode ("A categorical color name area of a color space in an aperture color mode and a surface color mode" Keiji UTIKAWA, et al.: Journal of Society of Illumination, Vol. 77, No. 6, pp 346–354). Even if display colors mutually having the same CIEXYZ value are concerned, it happens that an establishment of the different mode causes the display colors to be recognized mutually different colors. In order that display characteristics of a display unit is recognized in accordance with appearances for a color of a color chart so that looking ways for the respective display colors in a plurality of display units are matched by CMS and the like, there is a need to unify modes as to looking ways for a color of a color chart. In the event that as a display unit in which a match between display colors is intended, only a display is considered, unity to a color chart display format of either FIG. 10(A) or FIG. 10(B) involves no problem. However, in the event that a match between appearances on a printed matter and appearances on a display is intended, since appearances for a color of a printed matter is always concerned with the surface color mode, there is a need to unify also appearances on a display to the surface color mode. In this case, it is preferable that the display format as shown in FIG. 10(B) is adopted.

In this manner, when the color name is selected in the step S103 of FIG. 6, the process goes to a step S104 in which it is determined whether a selection of the color name is finished over all the color charts. In the event that it is decided that a selection of the color name is finished over all the color charts, the process goes to a step S105 in which a color chart to be next displayed is determined, and returns to the step S102. Thereafter, the steps S102 to 104 are repeated.

In the step S104, in the event that it is decided that a selection of the color name is finished over all the color charts, the process goes to a step S106 in which display characteristics of the display is identified by the display characteristics identification unit 55 so that characteristics information according to the identification result is derived from the characteristic information holder 54.

Figure 11:
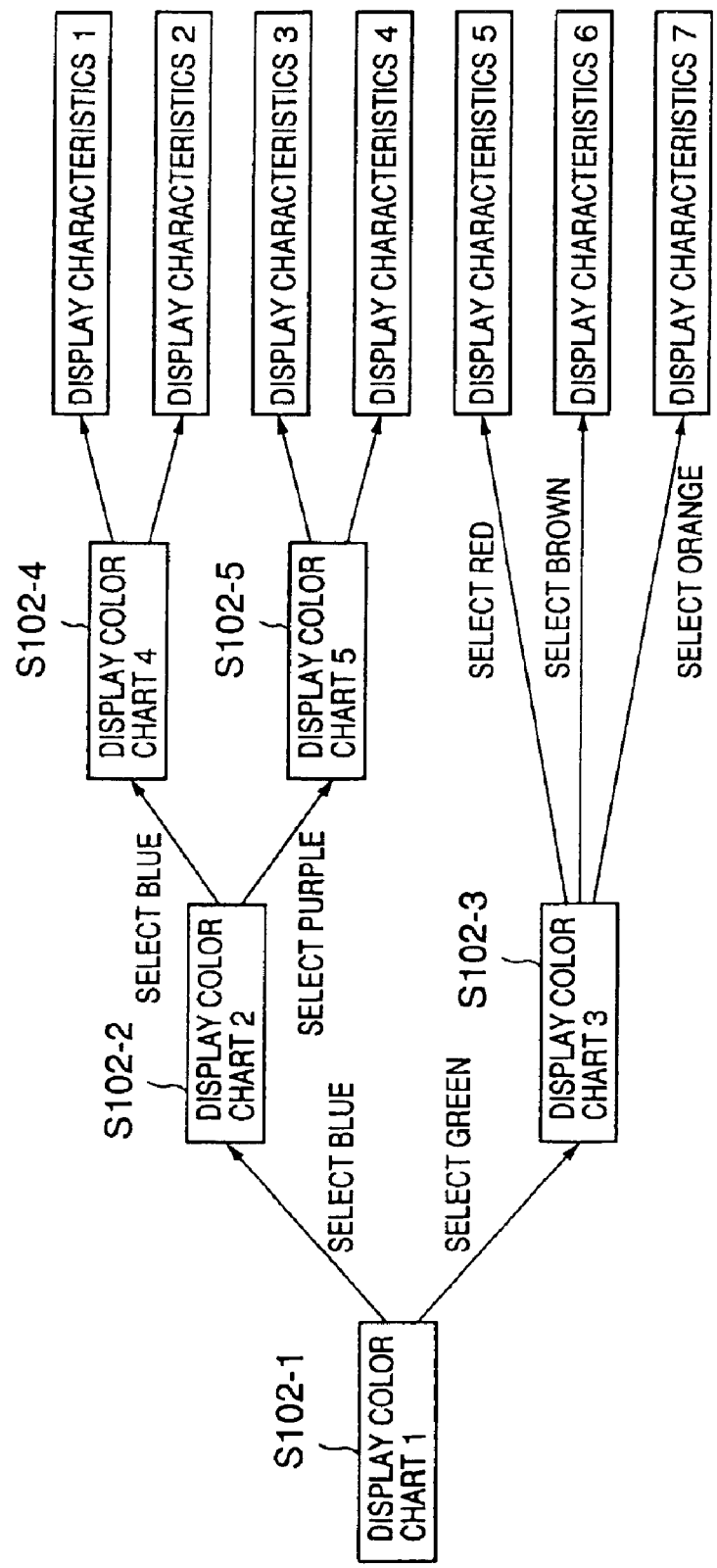
FIG. 11 is an illustration useful for understanding an example of a procedure in which a color chart is selected to decide display characteristics.

FIG. 11 is an illustration useful for understanding an example of a procedure in which a color chart is selected to decide display characteristics.

FIG. 11 shows a procedure that display characteristics is classified into seven sorts by five sorts of color chart, in which to decide display characteristics of one display two or three color charts are used.

The procedure for the classification proceeds from the left to the right of the figure. First, the first color chart is displayed (S102_1) in which as a color name of the first color chart blue or green is selected. Then, the second color chart (S102_2) or the third color chart (S102_3) is displayed in accordance with the selected color name. As a color name of the second color chart blue or purple is selected. Then, the fourth color chart (S102_4) or the fifth color chart (S102_5) is displayed in accordance with the selected color name. The display characteristics is determined as the first display characteristics or the second display characteristics in accordance with the selection of the color name of the fourth color chart. And the display characteristics is determined as the third display characteristics or the fourth display characteristics in accordance with the selection of the color name of the fifth color chart. As the color name of the third color chart, red, brown or orange is selected. Then the display characteristics is determined as the fifth, sixth or seventh display characteristics in accordance with the selection of the color name of the third color chart.

Thus, a chromaticity value representative of a color temperature is derived from the characteristic information holder 54 shown in FIG. 5 in form of the characteristic information in accordance with a determination result.

In order to determine the color temperature with greater accuracy in accordance with the above-mentioned procedure, some ten to several tens or more of color charts are needed. However, a color temperature of the display can be set up to the typical color temperatures such as 5000K, 6500K, 9300K. For example, the color temperature of 5000K corresponds to a color temperature under illumination of the general fluorescent light. In the event that a color match supposing the general environment is performed, it often happens that a color temperature of the display is set up to 5000K. However, a color displayed on the display is determined in accordance with a combination of a main body of the display and a control side (for example, a graphic card of a personal computer). For this reason, a value of the color temperature set up onto the display is simply associated with an accuracy of standards or so. Thus, even if 6500K is set up onto the display, it happens indeed, when the display is combined with the graphic card, that 5000K is established, or 8000K is established. In the event that it is sufficient to determine as to whether the color temperature set up onto the display is matched with an actual color temperature, it is possible to determine the color temperature of the display with a few color charts with great accuracy in such a manner that a series of color charts, in which the typical color temperatures such as 5000K, 6500K, 9300K are distinguished from one another, are used to classify the display characteristics, so that any one of the typical color temperatures is derived.

FIG. 11 shows a state that display characteristics is classified into seven sorts. Here, it is noted that there is no need that the color temperature according to the even sorts of display characteristics are mutually differentiated. For example, in the even that an RGB value of the second color chart is the above-mentioned RGB value (R,G,B) (75, 0, 255), a possibility that the color temperature is properly distinguished through appearances of the second color chart by a person is about 75%. Thus, it is desired that the distinction is modified in accordance with selection of a color name of the color chart.

In the step S106, when the display characteristics of the display is determined to derive the color temperature, the process goes to step S107 and step S108 in which γ characteristics is identified. In the step S107, an image for identification of γ characteristics is displayed on the display.

Figure 12:
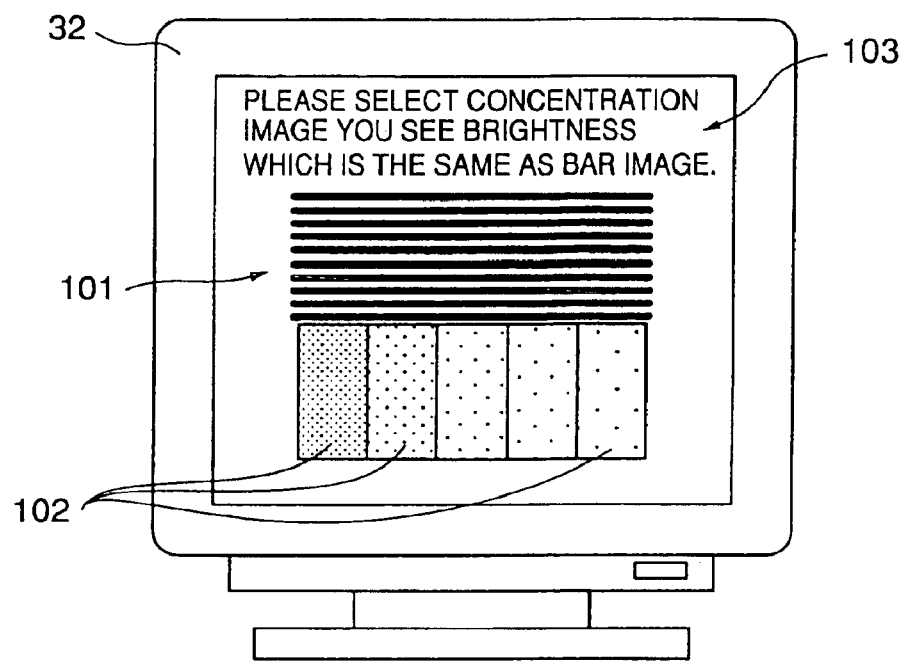
FIG. 12 is a view showing images for discriminating $\gamma$ characteristics.

FIG. 12 is a view showing images for discriminating γ characteristics.

FIG. 12 shows a display 32 on which displayed are a bar image 101 wherein black and white lines are alternately repeated and a plurality of concentration gray images 102 wherein they are mutually different in lightness. Further, above the images 101 and 102, there is displayed a character string 103 such as "Please select concentration image you see brightness which is the same as bar image". Thus, a user selects from among the plurality of concentration gray images 102 a concentration gray image on which the user see brightness which is the same as bar image 101 (step S108 in FIG. 6).

Figure 13:
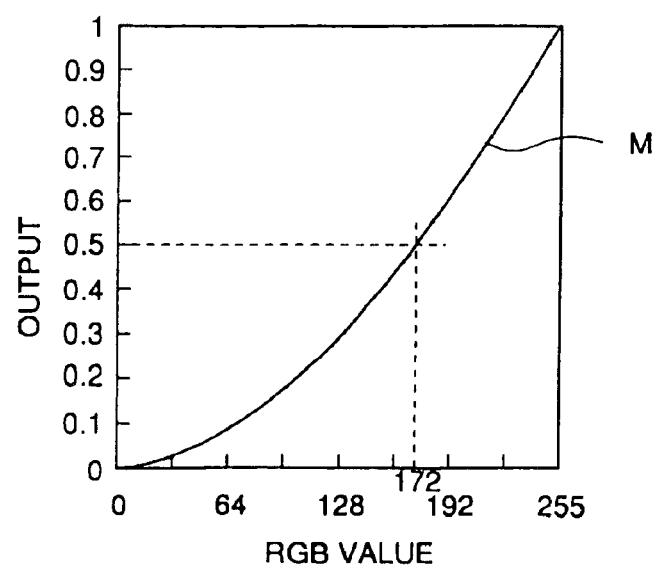
FIG. 13 is a graph showing an example of input-output characteristics of a display.

FIG. 13 is a graph showing an example of input-output characteristics of a display.

The axis of abscissas denotes an RGB value of an input and the axis of ordinates denotes the normalized output. When the RGB value of the input is expressed by X, and the output is expressed by Y, the curve M representative of input-output characteristics of a display is approximated by $Y = X^\gamma$.

The bar image 101 shown in FIG. 12 corresponds to the output 0.5. When the RGB value of the concentration gray image 102, which is the same as the bar image 101 in brightness, is given by (R, G, B)=(N, N, N), the relational expression represented by the following approximate expression consists.

$$0.5 = \left(\frac{N}{255}\right)^\gamma \qquad (2)$$

From the approximate expression (2), it is possible to calculate the γ coefficient. For example, when a user sees the bar image as it is the same as the concentration gray image, of which the RGB value is given by (172, 172, 172), in brightness, $0.5 = (172/255)^\gamma = 0.6745^\gamma$ is solved to obtain $\gamma \approx 1.75$. Thus, the γ coefficient is ≈1.75.

In this manner, in the steps S101 to S108 of FIG. 6, it is possible to obtain the above-mentioned information necessary for producing an ICC profile. Thereafter the process goes to a step S109 in which an ICC profile is produced in accordance with the information thus obtained, so that the ICC profile suitable for the display used by the user is provided.

FIG. 14 is a view showing a concrete example of an ICC profile.

The ICC profile consists of, as mentioned above, the profile header 1, the tagged element data 2 and the tag table 3. An explanation of the profile header 1 and the tag table 3 will be omitted to avoid the redundancy.

The tagged element data 2 shown in FIG. 14 stores data related to the display itself as well as data of CIEXYZ values of white as the above-mentioned standard white information. All the data related to the display itself are character strings. A character string such as "Fujitsu" is stored in a desc tag 110, a character string such as "Sample" is stored in a dmnd tag 111 and a dmdd tag 112, and a character string such as "Copyright (C) Fujitsu LTD. and Fujitsu Laboratories LTD. 1998" is stored in a cprt tag 113.

As mentioned above, in the tagged element data 2, a CIEXYZ value of white is stored in a wtpt tag 114 with a value normalized in such a manner that the CIEXYZ value of white is given by Y=1.0. FIG. 14 shows an example in which as a color temperature of the display, 8500K is determined. An xy chromaticity value of 8500K is given by (x, y)=(0.29, 0.31), and the CIEXYZ value (X, Y, Z) where Y=1.0 is calculated in accordance with the following equations.

$$X = Y(x/y) = 1.0 \times (0.29/0.31) = 0.935 \quad (3)$$

$$Y = 1.0 \quad (4)$$

$$Z = Y(1-x-y)/y = 1.0 \times (1-0.29-0.31)/0.31 = 1.290 \quad (5)$$

The values obtained through calculation by these equations (3), (4) and (5) are stored in the ICC profile. In the ICC profile, the CIEXYZ value is expressed in 16 bits (code 1 bit; integer part 7 bits; decimal part 8 bits) The ICC profile shown in FIG. 14 stores, as the CIEXYZ value, (0.92955, 1.00000, 1.262257).

Further, as mentioned above, in the tagged element data 2, as information indicative of an range of colors reproducible by an output unit, values in which CIEXYZ values of red, green and blue are normalized, are stored in an rXYZ tag 115, a gXYZ tag 116 and a bXYZ tag 117, respectively. FIG. 14 shows an example in which information indicative of an range of colors reproducible by a CRT display is stored. As mentioned above, the range of colors reproducible by a CRT display is represented in form of a triangle area on the xy chromaticity diagram. The xy chromaticity value of the top of the triangle area is given by the substantially constant value as set forth below regardless of makers.

| | | |
|---|---|---|
| Red: | (x, y) = | (0.63, 0.34) |
| Green: | (x, y) = | (0.29, 0.61) |
| Blue: | (x, y) = | (0.14, 0.07) |

When values, wherein CIEXYZ values of red, green and blue are normalized so as to be given by Y=1.0, are calculated, the following values are obtained.

| | | |
|---|---|---|
| Red: | (X, Y, Z) = | (1.85, 1.00, 0.09) |
| Green: | (X, Y, Z) = | (0.48, 1.00, 0.16) |
| Blue: | (X, Y, Z) = | (2.00, 1.00, 11.3) |

By the way, it is needed that the sum of CIEXYZ values of red, green and blue to be essentially determined is equal to a CIEXYZ value of white. For this reason, coefficients for red, green and blue to determine the essential respective CIEXYZ values from the provisionally calculated respective CIEXYZ values are given by a, b and c, the following equation consists.

$$a \times \text{red} + b \times \text{green} + c \times \text{blue} = \text{white} \quad (6)$$

Since X, Y and Z are independent of one another, the equation (6) consists on each of X, Y and Z. Therefore, the following equations are obtained.

$$1.85a + 0.48b + 2.0c = 0.93 \quad (7)$$

$$a + b + c = 1.0 \quad (8)$$

$$0.09a + 0.16b + 11.3c = 1.26 \quad (9)$$

When the equations (7), (8) and (9) are solved in form of simultaneous equations, the following values are obtained.

$$a = 0.22, \ b = 0.68, \ c = 0.10$$

Accordingly, the essential CIEXYZ values of red, green and blue are determined as follow.

Red: $(X, Y, Z) = (1.85, 1.00, 0.09) \times 0.22 = (0.40, 0.22, 0.02)$

Green: $(X, Y, Z) = (0.48, 1.00, 0.16) \times 0.68 = (0.33, 0.68, 0.11)$

Blue: $(X, Y, Z) = (2.00, 1.00, 1.1.3) \times 0.10 = (0.20, 0.10, 1.13)$

When those CIEXYZ values are stored in the ICC profile, stored are values which are those CIEXYZ values multiplied by the ratio of the CIEXYZ value of white to the CIEXYZ value $(X, Y, Z) = (0.9642, 1.0, 0.8251)$ corresponding to the color temperature of the light source of D50. Finally, values to be stored in the rXYZ tag, the gXYZ tag and the bXYZ tag are determined as follow:

Value of $rXYZtag = (0.40*(0.9642/0.9295), 0.22*(1.0/1.0), 0.02*(0.8251/1.29)) = (0.41, 0.22, 0.012)$ Value of $gXYZtag = (0.33*(0.9642/0.9295), 0.68*(1.0/1.0), 0.11*(0.8251/1.29)) = (0.34, 0.68, 0.07)$ Value of $bXYZtag = (0.20*(0.9642/0.9295), 0.1*(1.0/1.0), 1.13*(0.8251/1.29)) = (0.21, 0.10, 0.74)$ It is noted that similar to the above-mentioned CIEXYZ value for white, those values are affected by the operation error and the quantization error at the time of the storage of the profile. Thus, the values stored in the profile shown in FIG. 14 are slightly different from the calculated values.

In the tagged element data 2, γ characteristics for red, green and blue are stored in an rTRC tag 118, a gTRC tag 119 and a bTRC tag 120., respectively. Here, as γ characteristics, the respective gradation values in 0 input, ½ input and the maximum input are stored. The gradation values are stored in form of 16 bits of value where the maximum value is 65535. FIG. 14 shows an example in which γ coefficient is identified 2.0. In this case, the gradation values for red, green and blue are as follows:

Gradation value where 0 input=0

Gradation value where ½ input=$(0.52^{2.0}) \times 65535 = 16384$

Gradation value where the maximum input=65535

Those values are stored in the rTRC tag 118, the gTRC tag 119 and the bTRC tag 120.

Thus, when the ICC profile is produced in the step S109 in FIG. 6, an operation of the display characteristics recognition apparatus is terminated.

Next, there will be described alternative embodiments of the present invention hereinafter. In the following explanation, redundant description will be omitted and only different points from the first embodiment of the present invention will be described.

The second embodiment is substantially the same as the first embodiment except for the point that while the first embodiment is to produce the profile, according to the second embodiment, a plurality of profiles are previously prepared and held, and the optimum profile for display characteristics of a display is selected from among the plurality of profiles.

Figure 15:
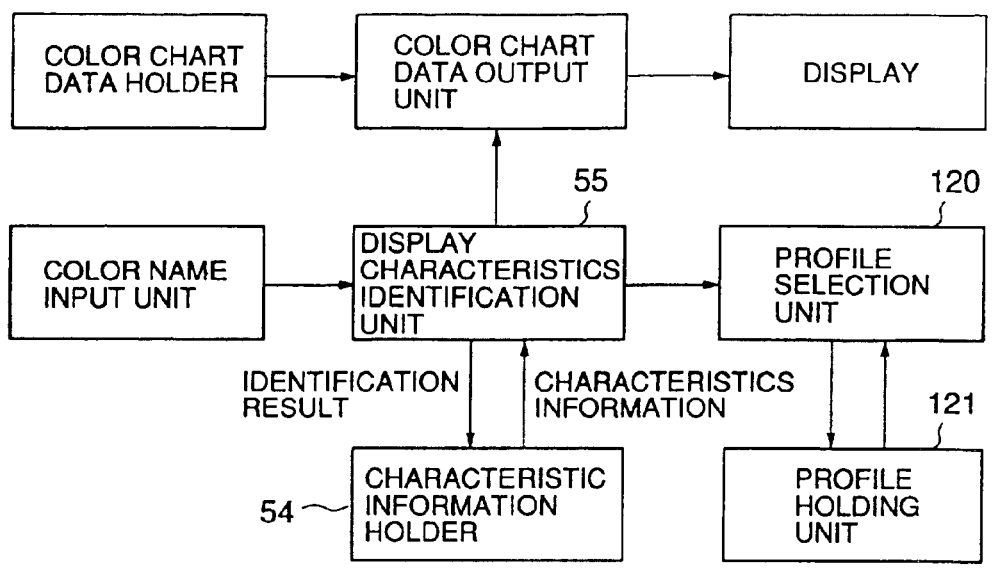
FIG. 15 is a functional block diagram showing a second embodiment of a display characteristics recognition apparatus according to the present invention.

FIG. 15 is a functional block diagram showing a second embodiment of a display characteristics recognition apparatus according to the present invention.

In comparison with FIG. 5, the profile producing unit 56 is replaced by a profile selection unit 120 and a profile holding unit 121 for holding a plurality of profiles. The profile selection unit 120 selects one profile from among the plurality of profiles held by the profile holding unit 121 in accordance with the characteristic information obtained from the characteristic information holder 54 by the display characteristics identification unit 55. In other words, it is not always necessary that the characteristic information held in the characteristic information holder 54 is associated with the profile held in the profile holding unit 121. The profile selection unit 120 selects a suitable profile in accordance with a criterion such that a value indicative of display characteristics is close.

According to the first and second embodiments of the present invention, a display of the color chart and a selection of the color name are repeated over a plurality of number of times. However, according to a display characteristics recognition apparatus of the present invention, it is acceptable that a series of color charts are displayed at a time on a display, and color names of the respective color charts are entered on a batch basis.

Next, there will be described a third embodiment of the present invention. While the first embodiment of the present invention is to determine a color temperature as display characteristics, the third embodiment of the present invention is to determined a display luminance as display characteristics.

Figure 16:
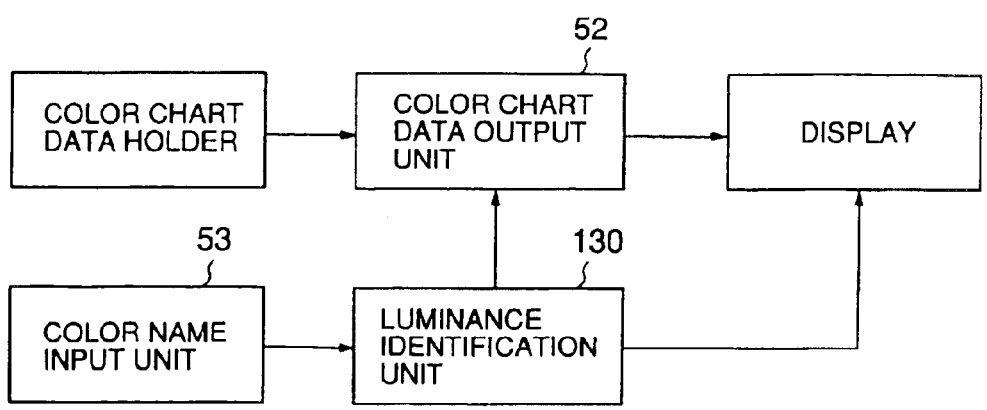
FIG. 16 is a functional block diagram showing a third embodiment of a display characteristics recognition apparatus according to the present invention.

FIG. 16 is a functional block diagram showing a third embodiment of a display characteristics recognition apparatus according to the present invention.

In comparison with FIG. 5, the display characteristics identification unit 55, the characteristic information holder 54 and the profile producing unit 56 are replaced by a luminance identification unit 130 for identifying luminance in accordance with data of a color chart outputted from the color chart data output unit 52 and a color name entered to the color name input unit 53.

Figure 17:
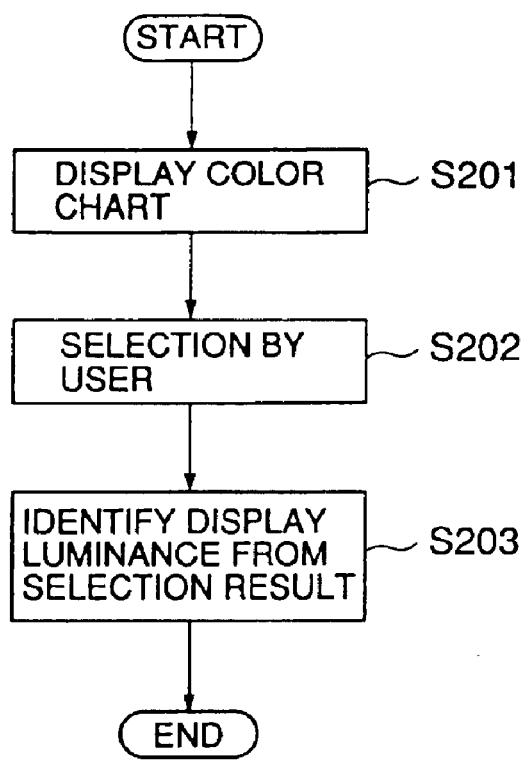
FIG. 17 is a flowchart useful for understanding an operating procedure of the third embodiment of the display characteristics recognition apparatus according to the present invention.

FIG. 17 is a flowchart useful for understanding an operating procedure of the third embodiment of the display characteristics recognition apparatus according to the present invention.

According to the third embodiment of the display characteristics recognition apparatus, first, the color chart based on the above-mentioned Bezold-Brücke Effect is displayed on the display (step S201). As mentioned above, according to the Bezold-Brücke Effect, it is known that as intensity of the color light (luminance) is increased, a tinge of blue or yellow of chromatic color other than blue, green, yellow and red is increased, and oppositely as intensity of the color light is decreased, a tinge of green or red is increased. For example, as a color light of 600 nm looking like orange is increased in lightness, a tingle of yellow is increased and finally does not look like orange (cf. "Color Science Dictionary" published by Color Society of Japan, pp 222). For this reason, according to the third embodiment, there is used such a color chart that a color near the boundary between the yellow area and the orange area in the categorical color perception is displayed.

Figure 18:
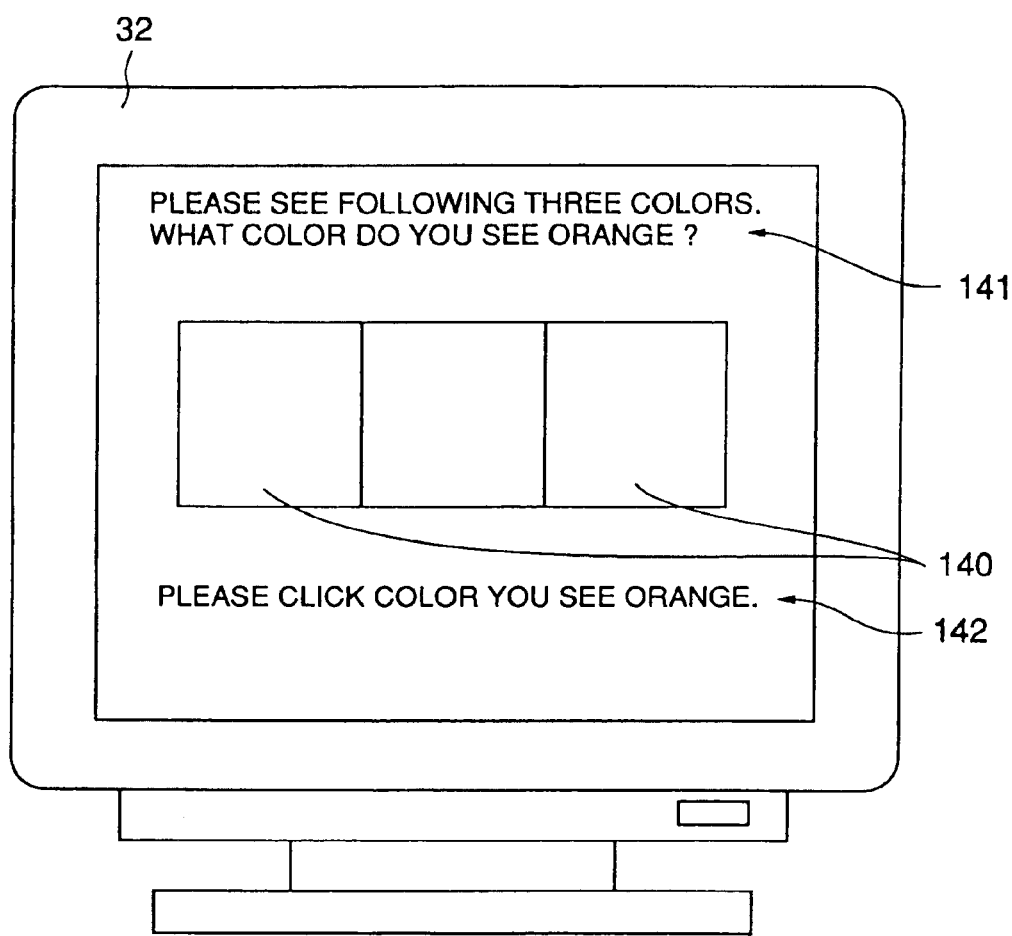
FIG. 18 is a view showing a state that a color chart is displayed in the third embodiment.

FIG. 18 is a view showing a state that a color chart is displayed in the third embodiment.

FIG. 18 shows a display 32 on which three color charts 140 at the center of a display screen. These color charts 140 are concerned with such a color chart that a display color is over an range from a yellow area to an orange area in the categorical color perception. Those color charts 140 are ones in which a relationship between a display luminance and an appearance of orange is previously determined through a subjective estimation experience. The left color chart of the three color charts 140 is concerned with a color chart on which persons over 50% recognized it as orange in the display of 100 cd/m$^2$, and likely the center color chart and the right color chart are concerned with a color chart on which persons over 50% recognized it as orange in 150 cd/m$^2$ and 200 cd/m$^2$, respectively.

Above the color charts 140, there is displayed a character string 141 such as "Please see the following three colors. What color do you see orange ?". Below the color charts 140, there is displayed a character string 142 such as "Please click color you see orange". Thus, a user clicks any of the color charts to select one (step S202 in FIG. 17).

In the step S202 in FIG. 17, when the selection by a user is performed, the process goes to a step S203 in which a display luminance is identified in accordance with a selection result. In this identification, a strict value of the display luminance is not determined, but it is determined as to which group the display luminance belongs to among groups (for example, three groups of 150 cd/m$^2$ or more, 100 cd/m$^2$ or more, and less than 100 cd/m$^2$) of display luminance suitably set up.

Incidentally, while FIG. 18 shows a state that the plurality of color charts are simultaneously displayed, it is acceptable that the plurality of color charts are sequentially displayed one by one.

Hereinafter, there will be described an embodiment of a display characteristics adjusting apparatus according to the present invention.

The embodiment of a display characteristics adjusting apparatus is constructed with the computer system shown in FIG. 4. The CDROM 40 shown in FIG. 4 is an example of a display characteristics adjusting program storage medium referred to in the present invention. The display 32 is a part of the display characteristics adjusting apparatus and is also a subject to be adjusted in display characteristics by the display characteristics adjusting apparatus. In the display characteristics adjusting apparatus, similar to the display characteristics recognition apparatus, color charts are displayed on the display 32.

Figure 19:
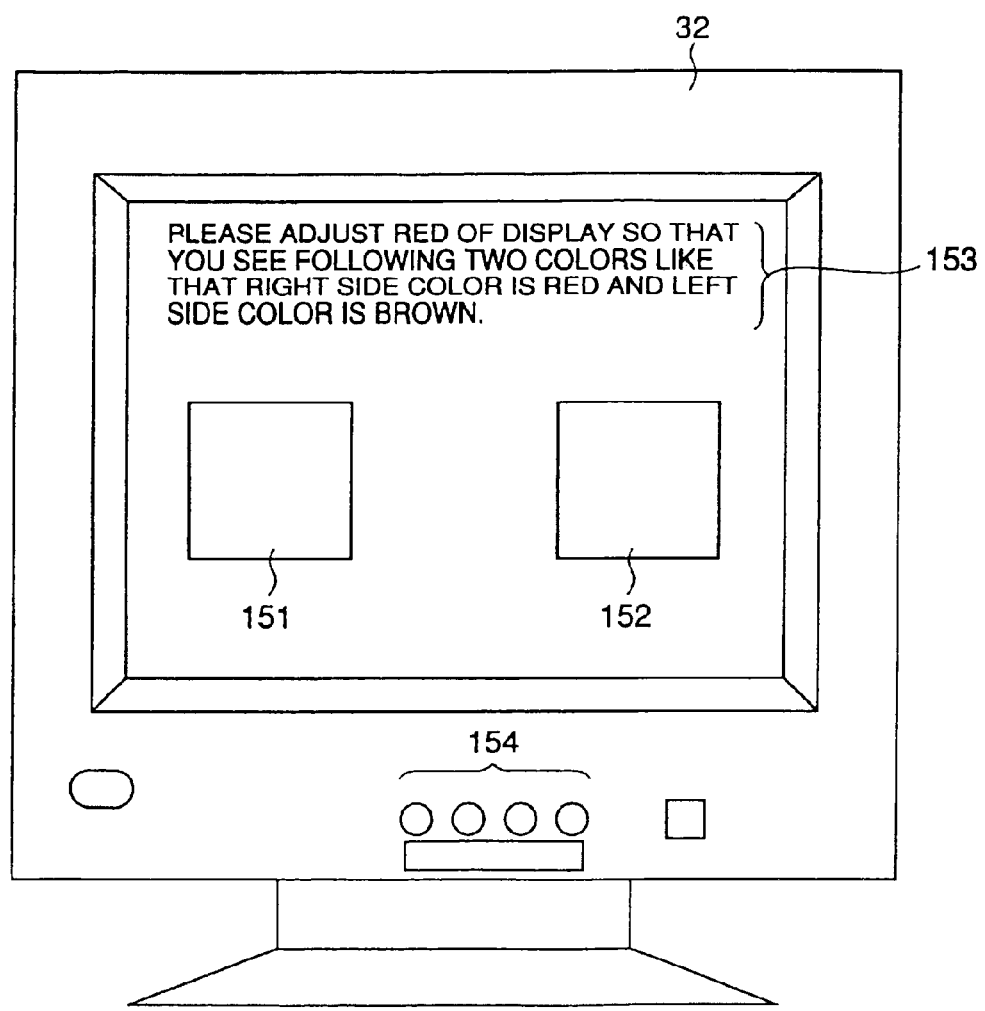
FIG. 19 is a view showing a state that a color chart is displayed by a display characteristics adjusting apparatus.

FIG. 19 is a view showing a state that color charts are displayed by a display characteristics adjusting apparatus.

FIG. 19 shows a display 32 on which two color charts 151 and 152 are displayed. Above those color charts 151 and 152, there is displayed a character string 153 such as "Please adjust red of display so that you see following two colors like that right side color is red and left side color is brown".

Added to the general display are various control mechanisms for altering a color display of the display, such as contrast, brightness, color temperature, RGB level, etc. The display 32 shown in FIG. 19 is provided with setting buttons 154 for altering a color display. An operation of the setting buttons 154 by a user such that a color display is adjusted in accordance with an appearance of a display color of a color chart makes it possible to adjust display characteristics of the display properly. In other words, it is possible to match the display characteristics of the display to display characteristics of another display unit, and as a result it is possible to match appearance of colors of various types of display units, for example, a display of a personal computer connected to a network, a liquid crystal screen of a note type of personal computer carried, and a liquid crystal projector for a presentation.

In the event that a more strict adjustment for the display is needed, it is desired that a software for adjustment of a color display of the display is utilized.

Figure 20:
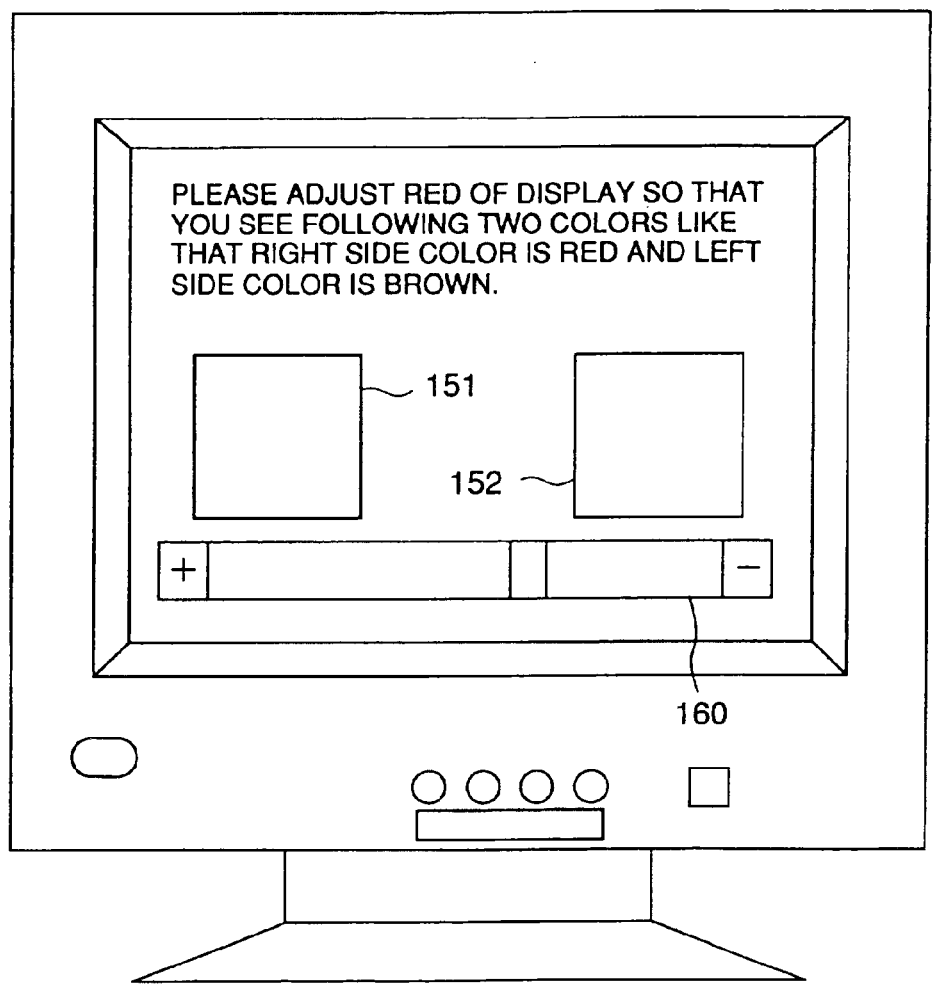
FIG. 20 is a view showing a display screen in a case where an adjustment is performed utilizing a software.

FIG. 20 is a view showing a display screen in a case where an adjustment of the display is performed utilizing such a software.

On such a display screen, in addition to color charts 151 and 152 which are similar to those in FIG. 19, a slide bar 160 is displayed below the color charts 151 and 152. Here, an operation of the slide bar 160 by a user makes it possible to adjust a display intensity of red. Of course, an alternation of sorts of a color chart or the like makes it possible to perform an adjustment for green and blue as well as red.

Some of the recent display boards have a function capable of adjusting R,G,B displays of the display by a display driver. In case of such a display board, it is acceptable to adjust a display using such a function.

As mentioned above, according to a display characteristics recognition apparatus of the present invention, it is possible even for a general user having no color measuring apparatus as mentioned above to determine display characteristics of a display unit. A display characteristics recognition program stored in a display characteristics recognition program storage medium of the present invention causes a computer system to operate as such a display characteristics recognition apparatus. Further, the computer system of the present invention serves as such a display characteristics recognition apparatus.

Further, according to a display characteristics adjusting apparatus of the present invention, it is possible even for a general user as mentioned above to adjust display characteristics of the display unit. A display characteristics adjusting program stored in a display characteristics adjusting program storage medium causes a computer system to operate as such a display characteristics adjusting apparatus. Further, the computer system of the present invention serves as such a display characteristics adjusting apparatus.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A display characteristics recognition apparatus comprising:

a signal output unit connected to a display unit displaying an image according to a signal entered, said display unit displaying the image with a color displayed according to both the signal and a display characteristic of said display unit, said signal output unit outputting a color chart signal representative of a color value to said display unit;

an input unit receiving interactive user input with which a user categorizes the color displayed, the input identifying or indicating a perceived color perception category perceived by the user to include the color displayed on said display unit in accordance with the color chart signal outputted from said signal output unit, where a color perception category comprises a range of a substantial number of humanly perceptible gradations of color within such color perception category; and a display characteristics identification unit automatically determining a value approximating the display characteristic of said display unit in accordance with the color value of the color chart signal outputted from said signal output unit and in accordance with the interactive input entered through said input unit.

2. A display characteristics recognition apparatus according to claim 1, wherein said display characteristics identification unit determines, as the display characteristic, a relationship between a signal representative of a white image and a color of an image displayed on said display unit in accordance with the signal.

3. A display characteristics recognition apparatus according to claim 2, wherein said display unit is selectively set up to any one of a plurality of display characteristics, and said display characteristics identification unit determines display characteristics parameters to which said display unit is set up.

4. A display characteristics recognition apparatus according to claim 1, wherein said display unit is a display in which an image is displayed through emission of light, and said display characteristics identification unit determines, as the display characteristic, luminance of said display.

5. A display characteristics recognition apparatus according to claim 1, wherein the color chart signal comprises color perception areas such that the color value is in one of two color perception areas adjacent to one another on a chromaticity diagram, and the color chart signal is displayed in chromaticity according to the display characteristic.

6. A display characteristics recognition apparatus according to claim 1, wherein said input unit enters a name of a color interactively selected from among color names associated with the color value of the color chart signal.

7. A display characteristics recognition apparatus according to claim 1, wherein said signal output unit outputs to the display unit a plurality of color chart signals each representative of a monochrome figure with a different color value to said display unit;

said input unit enters a name of a color of each of a plurality of monochrome figures; and said display characteristics identification unit determines the display characteristic of said display unit in accordance with the color values of the plurality of color chart signals outputted from said signal output unit and the plurality of names of the color entered through said input unit.

8. A display characteristics recognition apparatus according to claim 7, wherein said signal output unit outputs one of the plurality of color chart signals, and thereafter outputs, of the plurality of color chart signals, a color chart signal according to the name entered through said input unit to said display unit.

9. A display characteristics recognition apparatus according to claim 1, wherein said signal output unit outputs the color chart signal to said display unit, and in addition outputs to said display unit a signal causing black to be displayed around a monochrome figure displayed on said display unit according to the color chart signal.

10. A display characteristics recognition apparatus according to claim 1, wherein said signal output unit outputs the color chart signal to said display unit, and in addition outputs to said display unit a signal causing gray to be displayed around a monochrome figure displayed on said display unit according to the color chart signal and further causing black to be displayed around the gray.

11. A display characteristics recognition apparatus according to claim 1, wherein said signal output unit outputs a series of color chart signals such that a series of colors corresponding to color perception areas adjacent to one another on a chromaticity diagram are displayed, and the interactive input indicates or identifies a color corresponding to a boundary of two of the color perception areas.

12. A display characteristics recognition apparatus according to claim 1, wherein said display characteristics recognition apparatus further comprises a profile producing unit for generating data representative of display characteristics determined by said display characteristics identification unit in a predetermined format to produce a profile representative of characteristics as to display of an image by said display unit including the data.

13. A display characteristics recognition apparatus according to claim 1, wherein said display characteristics recognition apparatus further comprises:

a profile storage unit storing various sorts of profiles each representative of characteristics as to display of an image by a display unit including data indicative of various display characteristics in a common format; and a profile selection unit selecting one profile from among the various sorts of profiles stored in said profile storage unit in accordance with the display characteristics determined by said display characteristics identification unit.

14. A storage medium storing a display characteristics recognition program for performing a process, the process comprising:

displaying an image with a color displayed according to both a display characteristic of a display unit and a color chart representative of a color value;

interactively inputting, by a user, information identifying or indicating a perceived color perception category perceived by the user to include the color displayed on said display unit in accordance with the color chart, where a color perception category comprises a range of a substantial number of humanly perceptible gradations of color within such color perception category; and automatically determining a value approximating the display characteristic of said display unit in accordance with the color value of the color chart and in accordance with the interactively inputted information identifying or indicating the perceived color perception category.

15. A computer system comprising:

a display displaying an image according to a signal entered, said display displaying the image with a color displayed according to both the signal and a display characteristic of said display;

a main frame unit outputting to said display a color chart signal indicating a color value of a monochrome figure and color name signals, which are representative of a plurality of color names corresponding to the color value, respectively, and an input unit receiving user input, the user input indicating or identifying a color name perceived by the user and interactively selected from among said plurality of color names in accordance with an operation, where the information identifying or indicating the color name is a perceived color perception category of the color value displayed by the display unit according to the color chart signal and the display characteristic, and where a color perception category comprises a range of a substantial number of humanly perceptible gradations of color within such color perception category, wherein said main frame unit automatically determines a display characteristic of said display in accordance with the color chart signal outputted toward said display and the color name information received through said input unit.

16. A computer system comprising:

a display unit displaying an image according to a signal entered, said display unit displaying the image with a color displayed according to both the signal and a display characteristic of said display unit;

a main frame unit outputting for display by said display unit a series of color chart signals with color values in adjacent color perception areas on a chromaticity diagram, where each area is a different color perception category, and where a color perception category comprises a range of a substantial number of humanly perceptible gradations of color within such color perception category; and an input unit for interactively entering user input information indicating or identifying a perceived color corresponding to a boundary of the color perception categories of colors, which is interactively selected from among the colors displayed on said display unit, to said main frame unit in accordance with an operation, wherein said main frame unit automatically determines a display characteristic of said display unit in accordance with the color values of the colors displayed on the display unit and the user input information interactively entered through said input unit.

17. A computer system comprising:

a display unit for displaying an image according to a signal entered, said display unit displaying the image with a color according to both the signal and display characteristics of said display unit;

a main frame unit for outputting to said display unit a series of color chart signals such that a series of colors in adjacent areas for two sorts of colors adjacent to one another on a chromaticity diagram are displayed; and an input unit for a user to input a color corresponding to a boundary of the two sorts of colors, which is selected from among the series of colors displayed on said display unit, to said main frame unit in accordance with an operation, wherein said main frame unit determines display characteristics of said display unit in accordance with the color chart signal outputted toward said display unit and the color entered through said input unit, wherein said main frame unit outputs to said display unit the series of color chart signals, and in addition a message signal representative of a message inquiring as to from which color of the series of colors displayed on said display unit an operator visually identifies it as a color of a specified color name, where a color name identifies a color perception category, and where a color perception category comprises a range of a substantial number of humanly perceptible gradations of color within such color perception category.

18. A computer system comprising:

a display displaying an image according to a signal entered, said display displaying a color according to both the signal and a luminance display characteristic of said display;

a main frame unit causing said display to display a plurality of monochrome color patches with mutually different luminances of said display unit, each of the plurality of monochrome color patches being displayed with a same color value corresponding to a specified color name; and an input unit with which a user categorizes the color displayed by interactively selecting one of the monochrome patches displayed with a color of the specified color name of a color perception category of the plurality of monochrome patches displayed on said display unit, to said main frame unit in accordance with an operation, where a color perception category comprises a range of a substantial number of humanly perceptible gradations of color within such color perception category, wherein said main frame unit determines a value of the luminance display characteristic of said display unit in accordance with the color chart signal outputted toward said display unit and the monochrome patch selected through said input unit.

19. A computer system according to claim 18, wherein said main frame unit outputs color patches representative of a plurality of monochrome patches associated with mutually different luminance of said display unit, each of the plurality of monochrome patches being displayed with such a color that at least a predetermined ratio of persons have previously recognized it as the color of the specified color name under an associated luminance.

20. A display characteristics adjusting apparatus for adjusting display characteristics of a display unit for displaying an image according to a signal entered, said display unit displaying the image with a color according to both the signal and display characteristics of said display unit, said display characteristics adjusting apparatus comprising:

a signal output unit outputting a signal for display to said display unit such signal comprising a color chart signal with a color value belonging to an area of a chromaticity diagram that is adjacent to another area on the chromaticity diagram, the areas representing different color perception categories with a color value belonging to an area of a chromaticity diagram that is adjacent to another area on the chromaticity diagram, the areas representing different color perception categories, where the signal is displayed on said display unit in accordance with display characteristics of said display unit, and where a color perception category comprises a range of a substantial number of humanly perceptible gradations of color within such color perception category, and the apparatus allowing a user to categorize the displayed color by indicating which of the color perception categories the displayed color of the color chart signal is perceived to belong in.

21. A display characteristics adjusting program storage medium storing a display characteristics adjusting program able to be incorporated into a computer system, said display characteristics adjusting program for causing said computer system to operate a display characteristics adjusting apparatus for adjusting display characteristics of a display unit for displaying an image according to a signal entered, said display unit displaying the image with a color according to both the signal and display characteristics of said display unit, said display characteristics adjusting program comprising:

a signal output unit outputting a signal for display to said display unit such signal comprising a color chart signal with a color value belonging to an area of a chromaticity diagram that is adjacent to another area on the chromaticity diagram, the areas representing different color perception categories where the signal is displayed on said display unit in accordance with display characteristics of said display unit, where a color perception category comprises a range of a substantial number of humanly perceptible gradations of color within such color perception category, and allowing a user to categorize the displayed color by indicating which of the color perception categories the displayed color of the color chart signal is perceived to belong in.

22. A computer system comprising:

a display unit displaying an image according to a signal entered, said display unit displaying the image with a color according to both the signal and display characteristics of said display unit;

an adjusting unit adjusting display characteristics of said display unit in accordance with an operation; and a main frame unit for outputting a signal for display to said display unit such signal comprising a color chart signal with a color value belonging to an area of a chromaticity diagram that is adjacent to another area on the chromaticity diagram, the areas representing different color perception categories where the signal is displayed on said display unit in accordance with display characteristics of said display unit, where a color perception category comprises a range of a substantial number of humanly perceptible gradations of color within such color perception category, the system allowing a user to categorize the displayed color by indicating which of the color perception categories the displayed color of the color chart signal is perceived to belong in.

23. A display characteristics recognition apparatus comprising:

means for displaying an image on a display unit with a color determined by both an input signal and display characteristics of the display unit, and displaying a color chart signal;

means for inputting user input information identifying or indicating a name of a color displayed in accordance with the color chart signal as perceived by a user, where the name corresponds to a color perception category which comprises a range of a substantial number of humanly perceptible gradations of color within such color perception category; and means for automatically determining display characteristics of said display unit in accordance with the color chart signal and the indicated or identified name of the color.

24. A method, comprising:

displaying an image on a display unit with a displayed color determined by both an input signal and a display characteristic of the display unit, and displaying a color chart signal that specifies a color value corresponding to the displayed color;

categorizing the displayed color by a user interactively indicating a perceived color perception category of the displayed color, the color perception category comprising a range of a substantial number of humanly perceptible gradations of color within such color perception category; and automatically determining a value approximating the display characteristic of said display unit based on the color value corresponding to the color chart signal and based on the indication of the perceived color perception category.

25. A computer readable storage storing information for enabling a computer to perform a process, the process comprising:

displaying an image on a display unit with a displayed color determined by both an input signal and a display characteristic of the display unit, and displaying a color chart signal that specifies a color value corresponding to the displayed color;

categorizing the displayed color by a user interactively indicating a perceived color perception category of the displayed color, the color perception category comprising a range of a substantial number of humanly perceptible gradations of color within such color perception category; and automatically determining a value approximating the display characteristic of said display unit based on the color value corresponding to the color chart signal and based on the indication of the perceived color perception category.

26. An apparatus, comprising:

a display unit displaying an image on a display unit with a displayed color determined by both an input signal and a display characteristic of the display unit, and displaying a color chart signal that specifies a color value corresponding to the displayed color, an input unit used to allow a user to categorize the displayed color by interactively indicating a perceived color perception category of the displayed color, the color perception category comprising a range of a substantial number of humanly perceptible gradations of color within such color perception category; and a determining unit automatically determining a value approximating the display characteristic of said display unit based on the color value corresponding to the color chart signal and based on the indication of the perceived color perception category.

27. A method of color calibration, comprising: displaying a color with a display system;

receiving interactive input with which a user categorizes the displayed color by identifying or indicating a perceived color perception category of the displayed color, the color perception category comprising a range of a substantial number of humanly perceptible gradations of color within such color perception category; and automatically determining a value of a characteristic of the display system based on the interactively indicated color perception category.

28. A method according to claim 27, wherein the color perception category is one of two different such categories, and the displayed color is susceptible to being perceived in either of the two different color perception categories according to the value of the characteristic, and where the characteristic is one of luminance and color temperature.

29. A method of color calibration, comprising:

causing a display system to emit a color, where the emitted color is a product of both an unknown value of a characteristic of the display and a color value passed to the display;

receiving input with which a user categorizes the emitted color by identifying or indicating a perceived color perception category of the emitted color, the color perception category comprising a range of a substantial number of humanly perceptible gradations of color within such color perception category; and automatically determining the unknown value of the characteristic of the display based on the perceived color of the emitted color.

30. A method according to claim 29, wherein the received input identifies the perceived color perception category as one of white, orange, brown, gray, yellow, purple, pink, red, green, blue, or black.

31. A method, comprising:

categorizing the displayed color by a user interactively identifying or indicating a perceived color perception category of a color emitted by a display system, the color perception category comprising a range of a substantial number of humanly perceptible gradations of color within such color perception category;

automatically selecting a value of a characteristic of the display system based on the perceived general category, where the color value is such that, for different display systems, the emitted color of the color value tends to be perceived as being in a first general color category when emitted with a display system having a first value of the display characteristic, and the emitted color tends to be perceived as being in a second general color category when emitted with a display system having a second value of the display characteristic.

32. A method according to claim 31, wherein the automatically selected value of the characteristic of the display system is one of the first and second values of the display characteristic, and wherein the display characteristic is one of luminance and color temperature.

33. A method comprising automatically generating a color profile of a display system by a user interactively categorizing predetermined color values by the user identifying perceived color perception categories of the predetermined color values when displayed by the display system, and matching the perceived color categories to color categories expected to be perceived when displayed with different values of a display characteristic, the color perception categories each comprising a range of a substantial number of humanly perceptible gradations of color within such color perception category.

* * * * *

UNITED STATES PATENT AND TRADEMARK OFFICE
CERTIFICATE OF CORRECTION

PATENT NO. : 6,850,245 B1
DATED : February 1, 2005
INVENTOR(S) : Kimitaka Murashita et al.

It is certified that error appears in the above-identified patent and that said Letters Patent is hereby corrected as shown below:

Column 25,
Line 62, change "respectively," to -- respectively; --.

Column 29,
Line 27, change "color," to -- color; --.

Signed and Sealed this

Sixth Day of September, 2005

JON W. DUDAS
*Director of the United States Patent and Trademark Office*